US006840383B2

(12) United States Patent
Kitano et al.

(10) Patent No.: US 6,840,383 B2
(45) Date of Patent: Jan. 11, 2005

(54) PARTICLE SEPARATING APPARATUS

(75) Inventors: Yoichiro Kitano, Fuchu-cho (JP); Hironari Nagahara, Fuchu-cho (JP); Tetsuya Kanbara, Fuchu-cho (JP)

(73) Assignee: Mazda Motor Corporation, Hiroshima-ken (JP)

( * ) Notice: Subject to any disclaimer, the term of this patent is extended or adjusted under 35 U.S.C. 154(b) by 150 days.

(21) Appl. No.: 10/235,647

(22) Filed: Sep. 6, 2002

(65) Prior Publication Data

US 2003/0029779 A1 Feb. 13, 2003

Related U.S. Application Data

(62) Division of application No. 09/530,268, filed as application No. PCT/JP99/04659 on Aug. 30, 1999, now Pat. No. 6,450,344.

(30) Foreign Application Priority Data

Aug. 31, 1998 (JP) .......................................... 10-245840
Jul. 23, 1999 (JP) .......................................... 11-209617

(51) Int. Cl.[7] ............................ B03D 1/24; B03D 1/14; C02F 1/24; B04C 5/08; B04C 5/10

(52) U.S. Cl. ......................... 209/170; 209/17; 209/725; 209/730; 210/221.2; 210/295; 210/306

(58) Field of Search .......................... 209/170, 17, 725, 209/730; 210/221.2, 295, 512.1, 194, 199

(56) References Cited

U.S. PATENT DOCUMENTS 3,353,673 A * 11/1967 Visman ...................... 209/726
3,926,787 A * 12/1975 Gay .............................. 209/3
4,101,409 A * 7/1978 Austin ........................ 204/277
4,214,982 A * 7/1980 Pfalzer ....................... 209/164
4,282,097 A 8/1981 Kuepper et al.
4,340,487 A * 7/1982 Lyon .......................... 210/705
4,620,671 A * 11/1986 Skaar .......................... 241/19
5,139,652 A * 8/1992 LeBlanc ..................... 209/733
5,282,962 A 2/1994 Chen
5,389,274 A * 2/1995 Fernandez ................... 252/61
5,770,050 A * 6/1998 Trefz et al. ................. 209/170
6,450,344 B1 * 9/2002 Kitano et al. ............... 209/170

FOREIGN PATENT DOCUMENTS

DE 11 75 621 B 8/1964
DE 43 02 358 A 6/1992
FR 998 240 A 1/1952
FR 2 726 203 A 5/1996
GB 2 058 737 A 4/1981
GB 2 162 092 A 1/1986
JP 05-192515 8/1993
JP 05 277402 A 10/1993

OTHER PUBLICATIONS

Patent Abstract of Japan, vol. 18, No. 61 (C–1160) Feb. 2, 1994.

* cited by examiner

*Primary Examiner*—Thomas M. Lithgow
(74) *Attorney, Agent, or Firm*—Donald R. Studebaker; Nixon Peabody, LLP

(57) ABSTRACT

A particle separating apparatus is provided with a stock solution feeder (1) for supplying a stock solution containing particles, a bubble generator (2) for generating air bubbles to promote the separation of particles, a first separator (3) for separating the stock solution into a first concentrated solution and a first clear solution, a first discharge passage (4) for discharging the first concentrated solution separated by the first separator (3), a filtering device (5) provided inside the first separator (3) for filtering the particles in the first clear solution, a second separator (6) provided inside the filtering device (5) for separating the first clear solution into a second concentrated solution and a second clear solution, a second discharge passage (22) for discharging the second concentrated solution separated by the second separator (6) to the outside, and a clear solution guide passage (8) for guiding the second clear solution to the outside. Particles are effectively separated even in the case that a stock solution contains a large amount of particles having specific gravities similar to that of water.

12 Claims, 13 Drawing Sheets

PARTICLE SEPARATING APPARATUS

This application is a Divisional application of U.S. application Ser. No. 09/530,268, filed Apr. 28, 2000, now U.S. Pat. No. 6,450,344.

FIELD OF THE INVENTION

This invention relates to a particle separating apparatus for separating a stock solution containing particles into a concentrated solution having a high content of particles and a clear solution having a low content of particles.

BACKGROUND ART

A known particle separating apparatus is disclosed in, for example, Japanese Unexamined Patent Publication No. 5-277402. This apparatus is provided with a stock solution supply passage for supplying a stock solution containing particles, a gas injector for injecting a gas into the stock solution in the supply passage while dispersing it, a particle separator, a concentrated solution discharge passage for discharging the concentrated solution in the particle separator, and a clear solution discharge passage for discharging the clear solution in the particle separator. The particle separator swirls the stock solution flown from the supply passage to create a static pressure difference in radial directions, moves gas particles in the stock solution toward the center by the static pressure difference to generate a gas-liquid mixed swirl at the center, and concentrates the particles at one end of the longitudinal direction of the swirl by this gas-liquid mixed swirl to thereby separate the stock solution into a clear solution and a concentrated solution.

According to a centrifugal force and the static pressure difference created by swirling the stock solution, the particles contained in the stock solution and having larger specific gravities than water are moved toward the outside of the swirl and discharged to the outside via the concentrated solution discharge passage provided at a lateral side, whereas the particles contained in the stock solution and having smaller specific gravities than water are moved toward the center and then moved upward together with air bubbles generated at the center to be discharged via the clear solution discharge passage provided at an upper side.

In the particle separating apparatus thus constructed, the particles having larger specific gravities than water and those having smaller specific gravities than water can be effectively separated. However, colloidal or gelatinous particles having specific gravities similar to that of water cannot be effectively separated. It is difficult to prevent these particles from being mixed into the clear solution and admitted into the clear solution discharge passage. Thus, this apparatus has a problem of being unable to sufficiently separate the particles if a large quantity of particles having specific gravities similar to that of water are contained in the stock solution.

In the particle separating apparatus disclosed in the above publication, an outer tube member forming an outer casing of the apparatus is provided. This outer tube member is comprised of a large-diameter portion located below for installing an inner tube member forming the particle separator and a small-diameter portion located above to be connected with an upper member where the concentrated solution discharge passage is provided. Thus, this apparatus has additional problems of the complicated construction of the outer tube member and difficulty to manufacture the outer tube member.

DISCLOSURE OF THE INVENTION

It is an object of the present invention to provide a particle separating apparatus which has overcome the problems residing in the prior art.

It is another object of the present invention to provide a particle separating apparatus which can effectively separate particles even if a large quantity of particles having specific gravities similar to that of water are contained in a stock solution, and has a simplified construction so as to be easily manufacturable.

According to an aspect of the invention, a particle separating apparatus is adapted for separating a stock solution containing particles into a concentrated solution having a high content of particles and a clear solution having a low content of particles. There are provided a stock solution supplier for supplying the stock solution into a main portion of the separating apparatus; a bubble generator for generating air bubbles to promote the separation of particles; a first separator for separating the stock solution into a first concentrated solution and a first clear solution according to a centrifugal force created by swirling the stock solution supplied from the stock solution supplier; a first discharge passage for discharging the first concentrated solution separated by the first separator to the outside; a filter provided inside the first separator for permitting the passage of the first clear solution and collecting the particles in the first clear solution; a second separator provided inside the filter for generating a gas-liquid mixed swirl of the air bubbles and the first clear solution at or near its center according to a static pressure difference created in its radial directions by swirling the first clear solution, and separating the first clear solution into a second concentrated solution and a second clear solution by the generated swirl; a second discharge passage for discharging the second concentrated solution separated by the second separator to the outside; and a clear solution guide passage for guiding the second clear solution to the outside.

According to another aspect of the invention, there are provided an outer tube formed of a tubular member; a pair of lids for closing openings at the opposite ends of the outer tube; an inner tube provided inside the outer tube and formed with through holes; a stock solution supplier for supplying the stock solution into a main portion of the separating apparatus in such a manner as to swirl the stock solution along the outer tube; a first discharge passage for discharging a first concentrated solution separated by a centrifugal force acting as the stock solution is swirled; a bubble generator for generating air bubbles to collect the particles in a first clear solution produced by separating the stock solution by the centrifugal force when the first clear solution is admitted into the inner tube through the through holes of the inner tube; a particle separating unit provided inside the inner tube for moving the air bubbles toward its center according to a static pressure difference created in its radial directions by swirling the first clear solution to generate a gas-liquid mixed swirl and concentrating the particles on one side of the longitudinal direction of the gas-liquid mixed swirl by the gas-liquid mixed swirl to separate the first clear solution into a second concentrated solution and a second clear solution; a second discharge passage for discharging the second concentrated solution separated by the particle separating unit to the outside; and a clear solution guide passage for guiding the second clear solution produced by removing the particles to the outside.

According to still another aspect of the invention, there are provided an outer tube formed of a tubular member; a pair of lids for closing openings at the opposite ends of the outer tube; a stock solution supplier for supplying the stock solution into the outer tube; a bubble generator for generating air bubbles to promote the separation of particles; a particle separating unit for moving the air bubbles toward its center according to a static pressure difference created in its radial directions by swirling the stock solution supplied from the stock solution supplier to generate a gas-liquid mixed swirl and concentrating the particles on one side of the longitudinal direction of the gas-liquid mixed swirl by the gas-liquid mixed swirl to separate the stock solution into a concentrated solution and a clear solution; a concentrated solution discharge passage for discharging the concentrated solution to the outside; and a clear solution guide passage for guiding the clear solution produced to the outside. The concentrated solution discharge passage and the stock solution supplier are connected with the outer tube in positions spaced apart along the longitudinal direction of the outer tube, and the outer diameter of the connected end of the stock solution supplier is set smaller than that of the connected end of the concentrated solution discharge passage.

According to yet still another aspect of the invention, there are provided an outer tube formed of a tubular member; a pair of lids for closing openings at the opposite ends of the outer tube; a stock solution supplier for supplying the stock solution into the outer tube; a bubble generator for generating air bubbles to promote the separation of particles; a particle separating unit for moving the air bubbles toward its center according to a static pressure difference created in its radial directions by swirling a stock solution supplied via the stock solution supply passage of the stock solution supplier to generate a gas-liquid mixed swirl and concentrating the particles on one side of the longitudinal direction of the gas-liquid mixed swirl by the gas-liquid mixed swirl to separate the stock solution into a concentrated solution and a clear solution; a concentrated solution discharge passage for discharging the concentrated solution to the outside; and a clear solution guide passage for guiding the clear solution produced to the outside. The circumferential surface of the outer tube is formed straight between a portion near where the stock solution supply passage is connected and a portion near where the concentrated solution discharge passage is connected.

According to further aspect of the invention, there are provided a stock solution supplier for supplying the stock solution into the separating apparatus; a foaming agent injector for injecting a foaming agent to promote the separation of particles; a particle separating unit for moving the air bubbles toward its center according to a static pressure difference created in its radial directions by swirling the stock solution supplied via a stock solution supply passage of the stock solution supplier to generate a gas-liquid mixed swirl and concentrating the particles on one side of the longitudinal direction of the gas-liquid mixed swirl by the gas-liquid mixed swirl to separate the stock solution into a concentrated solution and a clear solution; a concentrated solution discharge passage for discharging the concentrated solution to the outside; and a clear solution guide passage for guiding the clear solution produced to the outside.

These and other objects, features and advantages of the present invention will become more apparent upon a reading of the following detailed description and accompanying drawings.

BEST MODE FOR CARRYING OUT THE INVENTION

Figure 1:
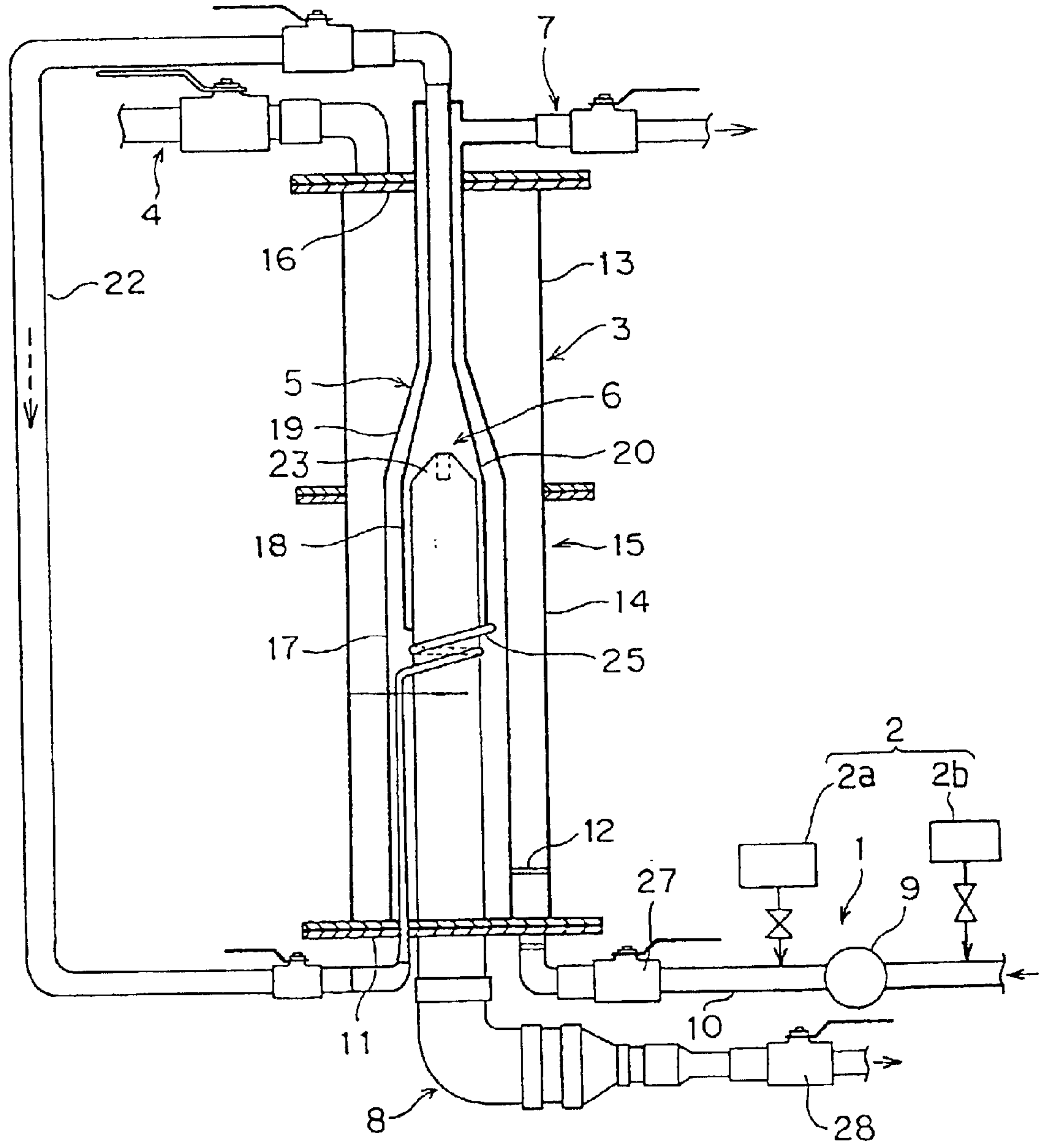
FIG. 1 is a diagram showing a basic embodiment of a particle separating apparatus according to the invention.

FIG. 1 shows one embodiment of a particle separating apparatus according to the invention. This particle separating apparatus is provided with a stock solution feeder 1, a bubble generator 2, a first separator 3, a first discharge passage 4, a filtering device 5, a second separator 6, a second discharge passage 22 ad a clear solution discharge passage 8. The feeder 1 supplies a stock solution containing particles. The bubble generator 2 generates air bubbles for promoting the separation of particles. The first separator 3 separates the stock solution into a first concentrated solution and a first clear solution. The first discharge passage 4 discharges the first concentrated solution separated by the first separator 3. The filtering device 5 is arranged inside the first separator 3 to permit the passage of the, first clear solution while collecting the particles in the first clear solution. The second separator 6 is arranged inside the filtering device 5 to separate the first clear solution into a second concentrated solution and a second clear solution. The second discharge passage 22 discharge the second concentrated solution separated by the second separator 6 to the outside. The clear solution discharge passage 8 discharges the second clear solution to the outside.

Figure 2:
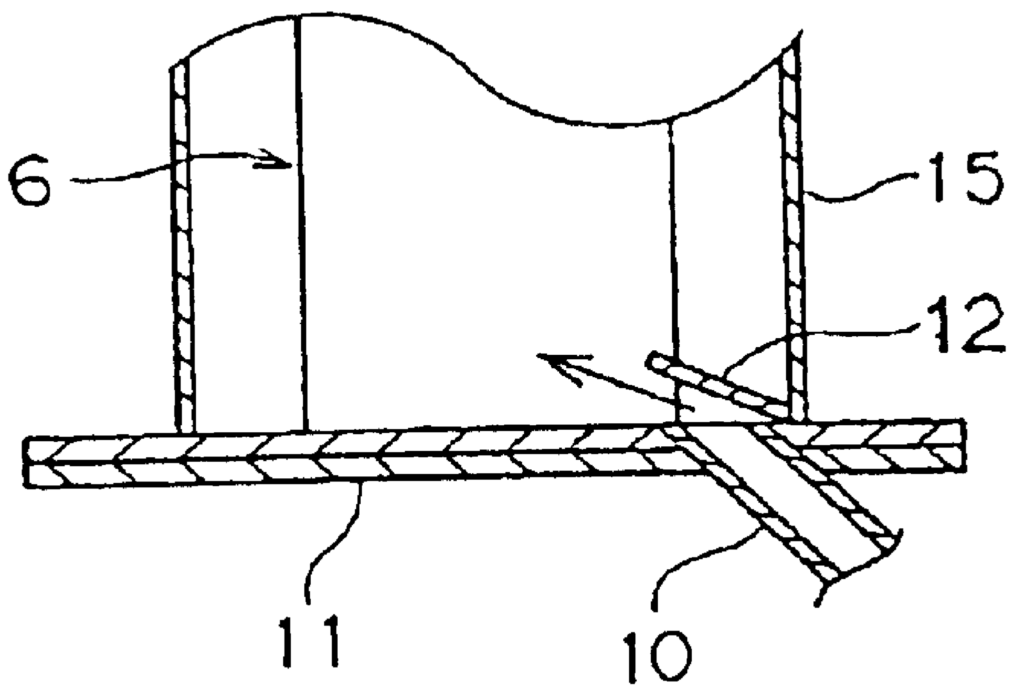
FIG. 2 is a section showing the construction of a stock solution supplying device.

The feeder 1 includes a solution pump 9 for pressure-feeding the stock solution fed from an unillustrated stock solution tank and a stock solution supply passage 10 made of a pipe in which a regulating valve for regulating a pressure and a flow rate of the stock solution admitted into the separating device. The stock solution is swirled in the first separator 3 by feeding the stock solution into the first separator 3 at a specified pressure by the pump 9. Specifically, as shown in FIG. 2, the leading end of the supply passage 10 is obliquely connected with a lid 11 provided at the bottom end of the first separator 3, and a guide plate 12 for guiding the stock solution to flow substantially in horizontal direction along the inner surface of an outer tube 15 forming the first separator 3 is provided above the connection of the supply passage 10 and the lid 11. The stock solution is caused to swirl in the first separator 3 by being guided by the guide plate 12.

The admitting pressure of the stock solution fed by the solution pump 9, i.e., the feeding pressure of the stock solution to the apparatus, is desirably settable according to the size of the apparatus or the application thereof. In order to effective improve the separation of particles by properly forming a gas-liquid mixed swirl by causing the stock solution to vigorously flow in the first separator, it is desirable to set the admitting pressure of the stock solution at 14.7 kPa or larger.

The bubble generator 2 includes a foaming agent injector 2*a* provided downstream from the solution pump 9 of the feeder 1 for injecting a foaming agent into the stock solution and a gas injector 2*b* provided upstream from the solution pump 9 for injecting gas into the stock solution. Air bubbles generated by the resolution or dissolution of the foaming agent such as sodium bicarbonate, dry ice or hydrogen peroxide injected into the stock solution by the foaming agent injector 2*a*, and air bubbles generated by gas dispersed and mixed into the stock solution by the gas injector 2*b* are admitted into the apparatus together with the stock solution.

The first separator 3 include the outer tube 15 formed by coupling a pair of cylindrical members 13, 14 one over the other along the longitudinal direction thereof, and a pair of lids 16, 11 for closing the opposite open ends of the outer tube 15. By moving the particles having larger specific gravities to the outer side according to a centrifugal force produced by causing the stock solution mixed with the air bubbles to swirl in the outer tube 15, the stock solution is separated into the first concentrated solution having a high content of particles having large specific gravities and the first clear solution having a low content of particles.

A base end of a pipe forming the first discharge passage 4 is connected to an outer side of the upper surface of the lid 16 provided above the first separator 3. Further, the leading end of the supply passage 10 is connected to an outer side of the lower surface of the lid 11 provided below the first separator 3, and the concentrated solution discharge passage 7 for discharging the concentrated solution containing the particles collected by the filtering device 5 to the outside is inserted through the middle of the lid 16.

The filtering device 5 includes a first tubular member 17 arranged in the first separator 3 and extending along the entire length of the outer tube 15, and a second tubular member 18 arranged inside the first tubular member 17 and extending along the half of the first tubular member 17. In the middle of the first tubular member 17 is provided a tapered conical portion 19 whose diameter decreases as it extends upward. The second tubular member 18 is also provided with a tapered conical portion 19 corresponding to that of the first tubular member 17.

Figure 3:
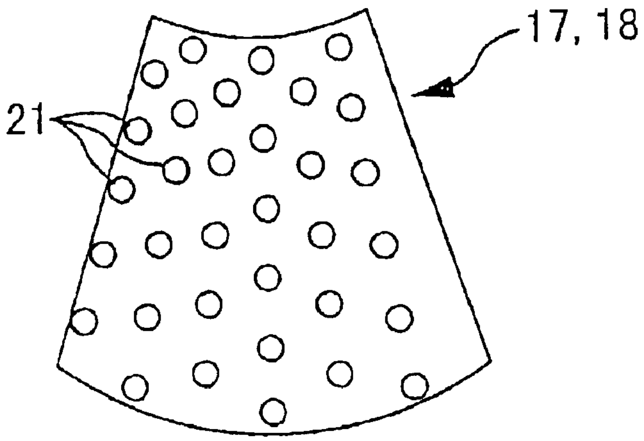
FIG. 3 is a development showing the construction of a filtering device.
Figure 3:
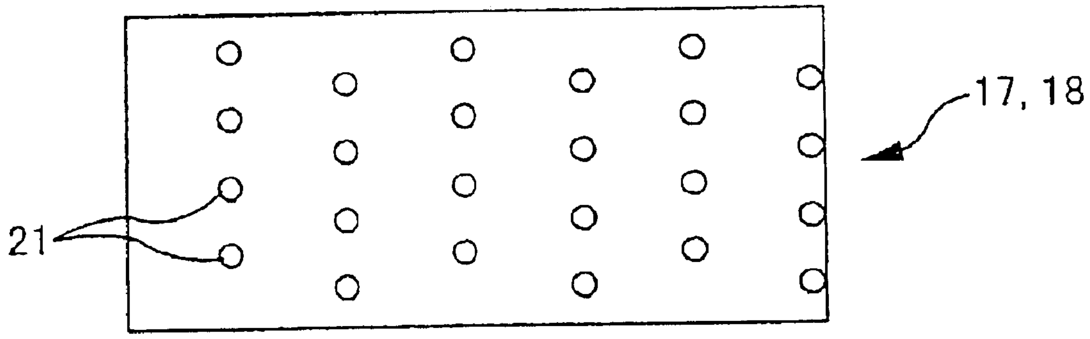
Figure 4:
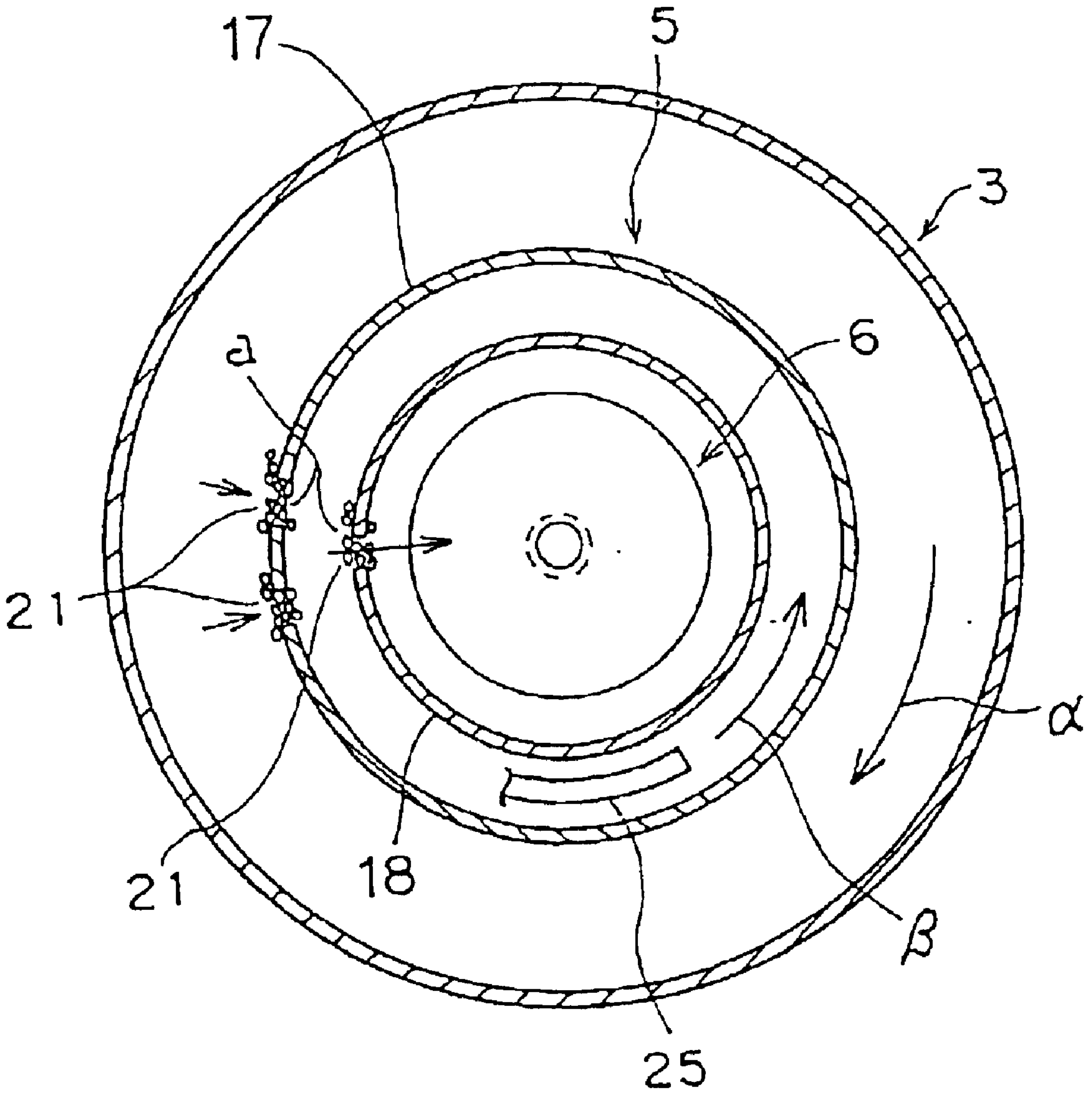
FIG. 4 is a plan view in section showing an essential portion of the particle separating apparatus.

Further, through holes 21 having a specified diameter are so formed in the walls of the first and second tubular bodies 17, 18 as to offset to each other at specified intervals as shown in the development of FIG. 3. As shown in FIG. 4, air bubbles a generated by the foaming agent injected from the foaming agent injector 2*a* of the bubble generator 2 and the gas injected from the gas injector 2*b* thereof deposit in such a manner as to cover the through holes 21, and the particles having specific gravities similar to that of water, which are contained in the first clear solution, are collected by these air bubbles a.

The diameter of the through holes 21 formed in the walls of the firs and second tubular members 17, 18 are suitably set according to the size of the separating apparatus, the admitting pressure of the stock solution, and other factors. For example, the diameter of the through holes 21 is set at a smaller value if the admitting pressure of the stock solution is high than if it is low. The setting of a proper value prevents the air bubbles a depositing on the wall surfaces of the first and second tubular members 17, 18 in such a manner as to cover the through holes 21 from separating from the wall surfaces due to a water pressure of the first clear solution passing through the through holes 21.

The particles collected by the air bubbles depositing to cover the through holes, i.e., the particles having specific gravities similar to that of water move up together with the air bubbles a and are discharged to the outside through the concentrated solution discharge passage 7 connected with the middle of the upper surface of the upper lid 16. In this way, the concentrated solution having a high content of such particles can be collected.

To the upper end of the second tubular member 18 is connected a base end of the second discharge passage 22 made of a pipe for discharging the second concentrated solution separated by the second separator 6 to the outside. To the leading end of the second discharge passage 22 is connected a recycle passage 25 which is installed between the first and second tubular members 17, 18 of the filtering device 5 through the lower lid 11. This passage 25 supplies the second concentrated solution discharged to the outside via the second discharge passage 22 to between the first and second tubular members 17, 18 in order to recycle this solution.

Figure 5:
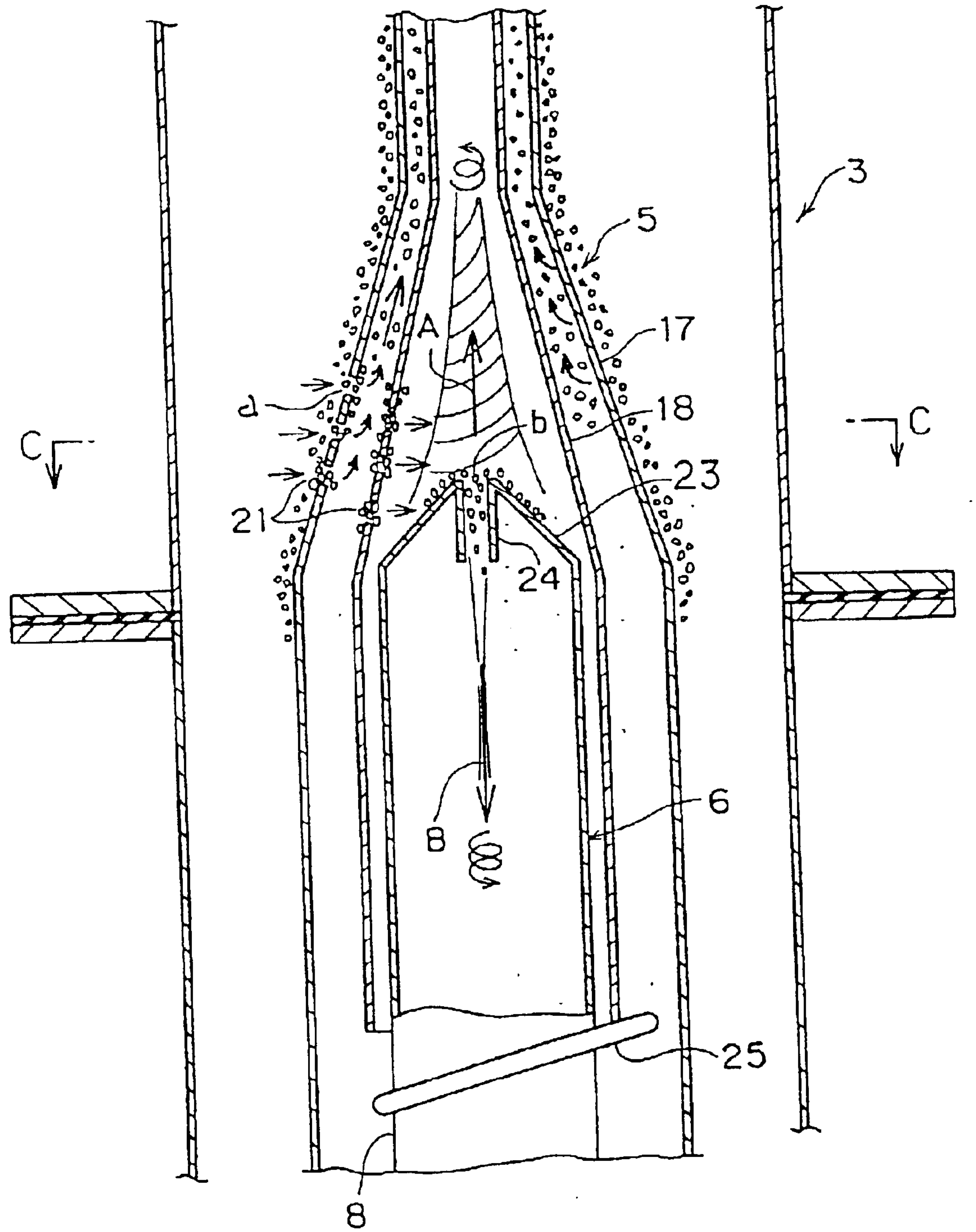
FIG. 5 is a front view in section showing an essential portion of the particle separating apparatus.

Further, the recycle passage 25 is provided that the leading end thereof extends along an arc along the outer surface of the second separator 6 as shown in FIGS. 4 and 5. Thus, the second concentrated solution supplied between the first and second tubular members 17, 18 of the filtering device 5 via the passage 25 is swirled along the outer surface of the second separator 6. A swirling direction β of the second concentrated solution is opposite from a swirling direction a of the stock solution supplied from the stock solution feeder 1.

The second separator 6 is arranged inside the second tubular member 18 of the filtering device 5, and is formed of a tubular body continuously connected with the upper end of the clear solution guide passage 8. At the upper end of the second separator 6 are provided a tapered conical portion 23 and a cylindrical portion 24 extending downward from the middle of the conical portion 23.

By the swirling of the second clear solution supplied into the second separator 6 through the through holes 21 of the filtering device 5, a gas-liquid mixed swirl of the air bubbles generated by the foaming agent and gas injected from the bubble generator 2 is generated. The second concentrated solution moves up by a buoyant force created at the center by the gas-liquid mixed swirl, with the result that the first clear solution is separated into the second concentrated solution and the second clear solution.

Figure 6:
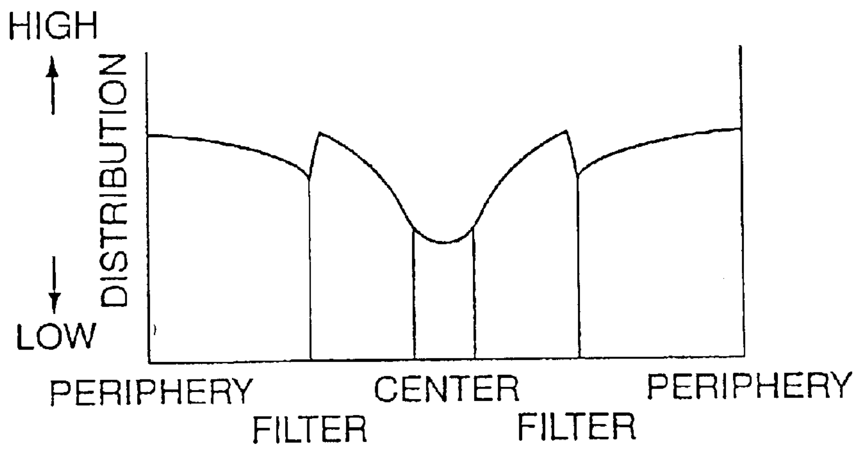
FIG. 6 is a graph showing a distribution of static pressure in section C—C of FIG. 5.

More specifically, the first clear solution is swirled by the stock solution swirling in the first separator 3 and the second concentrated solution supplied to the first and second tubular members 17, 18 of the second separator 2 via the recycle passage 25. As a result, a static pressure distribution is obtained in which the static pressure at the center becomes lower than at the peripheral portion after the pressure is slightly increased by a resistance when the first clear solution passes through the filtering device 5 as shown in FIG. 6. Thus, the first clear solution containing particles having specific gravities smaller than that of water and the air bubbles mixed into the stock solution move toward the center upon being subjected to the buoyant force caused by the static pressure difference.

As shown in FIG. 5, air bubbles b are so formed at the center of the second separator 6 as to cover an opening of the cylindrical portion 24. Further, since the gas-liquid mixed swirl of the air bubbles and the first clear solution is generated, the particles having smaller specific gravities move upward as indicated by an arrow A in FIG. 5 upon being subjected to the buoyant force of the gas-liquid mixed swirl after being collected by the air bubbles b. As a result, the first clear solution is separated into the second concentrated solution and the second clear solution. The second concentrated solution is supplied to between the first and second separators 3, 6 by the recycle passage 25 and regularly collected after being discharged to the outside via the second discharge passage 22 connected to the upper end of the second tubular member 18.

The second clear solution produced by removing the particles having smaller specific gravities flows downward as indicated by an arrow B through the opening of the cylindrical portion 24, and is discharged to the outside via the clear solution guide passage 8, in which a regulating valve 28 for regulating a flow rate of the clear solution being discharged.

As described above, the particle separating apparatus is provided with the stock solution feeder 1 for supplying the stock solution containing the particles into the separating apparatus, the bubble generator 2 for generating the air bubbles to promote the separation of particles, the first separator 3 for separating the stock solution into the first concentrated solution and the first clear solution according to a centrifugal force created by swirling the stock solution supplied from the stock solution feeder 1, the first discharge passage 4 for discharging the first concentrated solution separated by the first separator, the filtering device 5 arranged inside the first separator for permitting the passage of the first clear solution and collecting the particles in the first clear solution, the second separator 6 arranged inside the filtering device 5 for swirling the first clear solution to generate the gas-liquid mixed swirl of the air bubbles and the first clear solution at its center according to the static pressure difference created in radial directions, and separating the first clear solution into the second concentrated solution and the second clear solution by the generated swirl, the second discharge passage 22 for discharging the second concentrated solution separated by the second separator 6 to the outside, and the clear solution guide passage 8 for guiding the second clear solution to the outside. Accordingly, various particles contained in the stock solution can be effectively removed.

More specifically, the stock solution containing the particles is supplied into the outer tube 15 forming the first separator 3 at a specified pressure by the stock solution feeder 1 while the foaming agent and gas are mixed into the stock solution by the bubble generator 2, and this stock solution is swirled in the first separator 3. Accordingly, the particles contained in the stock solution such as metal powder having specific gravities larger than that of water are moved outward by the centrifugal force created according to the swirling movement of the stock solution, with the result that the stock solution can be separated into the first concentrated solution having a high content of particles of large specific gravity and the first clear solution having a low content of such particles. Thus, the particles having large specific gravity can be rapidly and effectively removed and collected from the stock solution by discharging the first concentrated solution to the outside through the first discharge passage 4.

Since the first clear solution produced by removing the particles having large specific gravity is less influenced by the centrifugal force than the first concentrated solution, it moves inwardly of the first separator 3 as the first concentrated solution moves outward. Inside the first separator 3 is provided the filtering device 5 comprised of the first and second tubular members 17, 18 formed with the through holes 21, and the air bubbles a generated by the injection of the foaming agent and gas into the stock solution by the bubble generator 2 deposit in such a manner as to cover the through holes 21. Thus, when the first clear solution passes the through holes 21, colloidal or gelatinous particles contained in the first clear solution and having specific gravities similar to that of water are collected by the air bubbles a, thereby effectively removing such particles from the first clear solution.

Further, the gas-liquid mixed swirl of the first clear solution less influenced by the centrifugal force than the first concentrated solution containing the particles having large specific gravities and the air bubbles moved toward the center is generated according to the static pressure difference created by swirling the first clear solution inside the filtering device 5, and the second concentrated solution having a high content of particles having small specific gravities is moved up by the generated gas-liquid mixed swirl. Accordingly, the first clear solution can be separated into the second concentrated solution and the second clear solution having various particles removed therefrom. Therefore, the second concentrated solution is regularly collected by being discharged to the outside via the second discharge passage 22, and the second clear solution can be guided to the outside via the second clear solution guide passage 8, thereby collecting a clear solution of high purity.

Results of an experiment conducted to confirm the effects of the particle separating apparatus are described below. In this experiment was used an apparatus which includes the outer tube 15 having a diameter of 400 mm, the filtering device 5 formed with the through holes 21 having a diameter of 8 mm, the cylindrical portion 24 having an inner diameter of 15 mm, and the bubble generator 2 for generating air bubbles to promote the separation of particles by injecting a specified amount of foaming agent made of sodium bicarbonate at the downstream side of the liquid pump 9 by the foaming agent injector 2*a* and injecting a specified amount of gas to the upstream side of the liquid pump 9 by the gas injector 2*b*.

Further, as shown in TABLE-1 below, various stock solutions having different particles concentrations, which is a weight ratio of the particles per liter stock solution were supplied into the experiment apparatus at the pumping pressure of the liquid pump 9 provided in the stock solution feeder 1 and at admitting pressures and flow rates set at various values by the regulating valve 27. Further, the opening of the regulating valve 28 of the clear solution guide passage 8 is adjusted to control the flow rate of the clear solution being discharged ($m^3$/sec.). In this way, a treated solution ratio (%) which is a ratio of the flow rate of the stock solution supplied by the stock solution feeder 1 to the flow rate of the clear solution discharged ($m^3$/sec.) was set at various values.

The particles concentration (g/$m^3$) in the clear solution was measured, and compared with that (g/$m^3$) in the clear solution to calculate a particles removing rate (%) by the experiment apparatus. Further, data as shown in TABLE-2 were obtained by measuring the particles concentration (g/$m^3$) in the first concentrated solution discharged from the first discharge passage 4 and that (g/$m^3$) in the concentrated solution discharged from the concentrated solution discharge passage 7.

TABLE 1

| | Stock Solution | | | | | | |
|---|---|---|---|---|---|---|---|
| | Pumping Pressure (kPa) | Admitting Pressure (kPa) | Flow Rate ($m^3$/sec.) | Particles Conc. A.M.V. | PH | Particles Removing Rate (%) | Treated Solution Rate (%) |
| Test Ex.1 | 98 | 13.7 | $3.10 \times 10^{-4}$ | 696 | 7.4 | 79.2 | 21.8 |
| Test Ex.2 | 147 | 14.7 | $4.32 \times 10^{-4}$ | 403 | 7.4 | 67.2 | 17.5 |

TABLE 1-continued

| | | | Stock Solution | | | | |
|---|---|---|---|---|---|---|---|
| | Pumping Pressure (kPa) | Admitting Pressure (kPa) | Flow Rate ($m^3$/sec.) | Particles Conc. A.M.V. | PH | Particles Removing Rate (%) | Treated Solution Rate (%) |
| Test Ex.3 | 196 | 15.7 | $5.19 \times 10^{-4}$ | 796 | 7.3 | 89.3 | 15.0 |
| Test Ex.4 | 245 | 16.7 | $6.28 \times 10^{-4}$ | 771 | 7.3 | 87.3 | 13.3 |
| Test Ex.5 | 294 | 19.6 | $6.50 \times 10^{-4}$ | 681 | 7.3 | 85.0 | 14.0 |
| Test Ex.6 | 98 | 9.8 | $2.47 \times 10^{-4}$ | 494 | 7.5 | 52.0 | 45.4 |
| Test Ex.7 | 196 | 13.7 | $4.16 \times 10^{-4}$ | 354 | 7.4 | 63.8 | 29.7 |
| Test Ex.8 | 254 | 13.7 | $4.72 \times 10^{-4}$ | 320 | 7.4 | 77.2 | 26.9 |
| Test Ex.9 | 294 | 14.7 | $5.44 \times 10^{-4}$ | 499 | 7.4 | 72.1 | 23.6 |
| Test Ex.10 | 343 | 15.7 | $5.94 \times 10^{-4}$ | 1765 | 7.5 | 94.1 | 22.9 |
| Test Ex.11 | 98 | 13.7 | $4.00 \times 10^{-4}$ | 998 | 7.4 | 55.9 | 31.3 |
| Test Ex.12 | 147 | 15.7 | $5.60 \times 10^{-4}$ | 856 | 7.4 | 88.9 | 24.4 |
| Test Ex.13 | 196 | 17.7 | $6.62 \times 10^{-4}$ | 714 | 7.3 | 85.9 | 23.6 |
| Test Ex.14 | 245 | 23.5 | $8.60 \times 10^{-4}$ | 749 | 7.2 | 86.8 | 20.6 |

Note)
A.M.V. denotes actual measurement value

TABLE 2

| | Clear Solution | | | 1st Conc. Solution | | | 2nd Conc. Solution | | | |
|---|---|---|---|---|---|---|---|---|---|---|
| | A | B | C | A | B | C | A | B | C | D |
| TX 1 | $0.68 \times 10^{-4}$ | 145 | 7.2 | $1.82 \times 10^{-4}$ | 682 | 7.4 | $0.61 \times 10^{-4}$ | 693 | 7.4 | 79.2 |
| TX 2 | $0.76 \times 10^{-4}$ | 132 | 7.4 | $2.88 \times 10^{-4}$ | 479 | 7.4 | $0.68 \times 10^{-4}$ | 297 | 7.3 | 67.2 |
| TX 3 | $0.78 \times 10^{-4}$ | 85 | 7.2 | $3.67 \times 10^{-4}$ | 855 | 7.2 | $0.75 \times 10^{-4}$ | 703 | 7.2 | 89.3 |
| TX 4 | $0.84 \times 10^{-4}$ | 98 | 7.2 | $4.63 \times 10^{-4}$ | 611 | 7.2 | $0.81 \times 10^{-4}$ | 417 | 7.2 | 87.3 |
| TX 5 | $0.91 \times 10^{-4}$ | 102 | 7.2 | $4.72 \times 10^{-4}$ | 520 | 7.2 | $0.87 \times 10^{-4}$ | 418 | 7.1 | 85.0 |
| TX 6 | $1.12 \times 10^{-4}$ | 237 | 7.3 | $0.96 \times 10^{-4}$ | 680 | 7.4 | $0.39 \times 10^{-4}$ | 465 | 7.4 | 52.0 |
| TX 7 | $1.23 \times 10^{-4}$ | 128 | 7.3 | $2.65 \times 10^{-4}$ | 268 | 7.3 | $0.28 \times 10^{-4}$ | 221 | 7.3 | 63.8 |
| TX 8 | $1.27 \times 10^{-4}$ | 73 | 7.3 | $2.61 \times 10^{-4}$ | 526 | 7.3 | $0.86 \times 10^{-4}$ | 327 | 7.4 | 77.2 |
| TX 9 | $1.28 \times 10^{-4}$ | 139 | 7.3 | $3.63 \times 10^{-4}$ | 440 | 7.2 | $0.53 \times 10^{-4}$ | 460 | 7.2 | 72.1 |
| TX 10 | $1.36 \times 10^{-4}$ | 105 | 7.4 | $3.64 \times 10^{-4}$ | 700 | 7.5 | $0.94 \times 10^{-4}$ | 501 | 7.4 | 94.1 |
| TX 11 | $1.25 \times 10^{-4}$ | 440 | 7.3 | $2.12 \times 10^{-4}$ | 855 | 7.3 | $0.63 \times 10^{-4}$ | 687 | 7.3 | 55.9 |
| TX 12 | $1.37 \times 10^{-4}$ | 95 | 7.3 | $3.49 \times 10^{-4}$ | 1249 | 7.3 | $0.75 \times 10^{-4}$ | 967 | 7.3 | 88.9 |
| TX 13 | $1.56 \times 10^{-4}$ | 101 | 7.3 | $4.25 \times 10^{-4}$ | 1241 | 7.3 | $0.81 \times 10^{-4}$ | 793 | 7.1 | 85.9 |
| TX 14 | $1.77 \times 10^{-4}$ | 99 | 7.2 | $5.87 \times 10^{-4}$ | 1015 | 7.2 | $0.96 \times 10^{-4}$ | 948 | 7.2 | 86.8 |

Note)
A: Flow Rate ($m^3$/sec.),
B: Particles Concentration ($g/m^3$)
C: PH,
D: Particles Removing Rate (%),
TX: Test Example The above data confirmed that the particles removing rate is 50% or higher in the particle separating apparatus according to the invention. This removing rate is remarkable better as compared with the prior art apparatus disclosed in the above publication whose particles removing rate is about 30%, or an axial cyclone separating apparatus whose particles removing rate is about 20% or lower.

Figure 7:
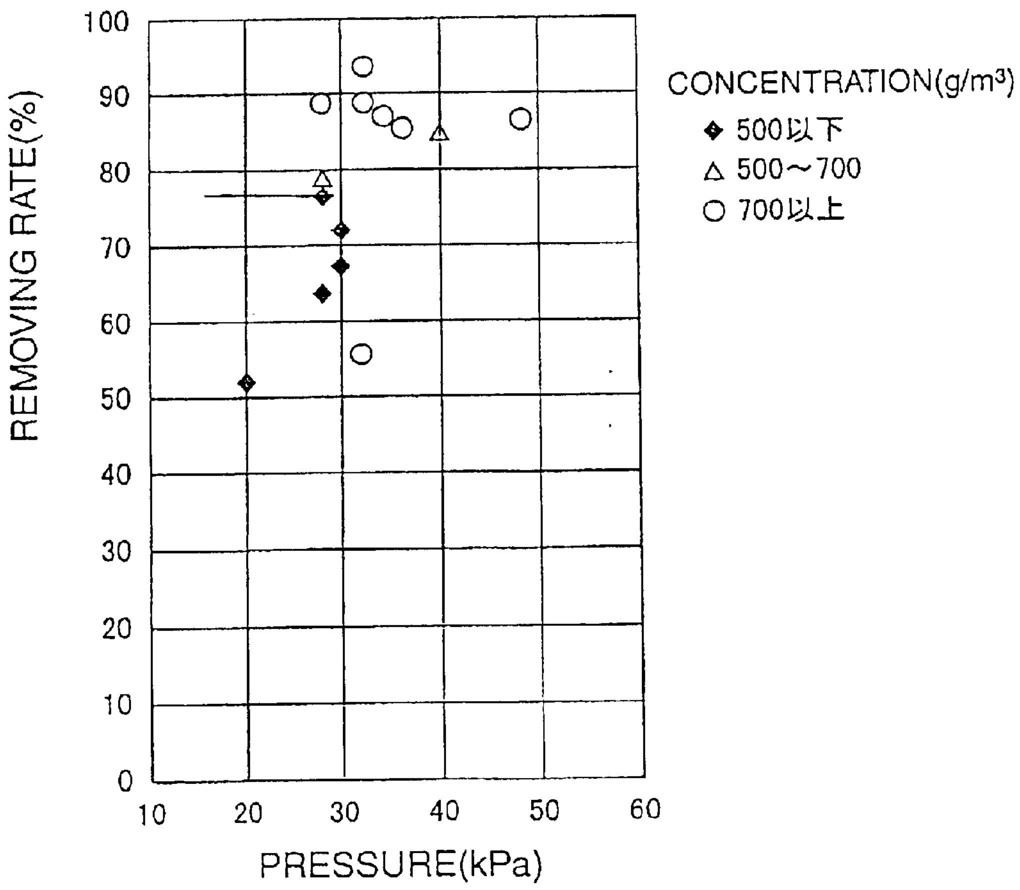
FIG. 7 is a graph showing a relationship between an admitting pressure of a stock solution and a removing rate of particles.

FIG. 7 is a graph showing the particles removing rate in relation to the admitting pressure at which the stock solution is supplied into the apparatus from the stock solution feeder 1. This graph shows that the particles removing rate can be remarkably improved if the admitting pressure of the stock solution is set at 14.7 kPa or higher. This is thought to be based on the following reason. If the admitting pressure of the stock solution is below 14.7 kPa, the static pressure difference for generating the gas-liquid mixed swirl is difficult to create and, accordingly, the air bubbles to deposit at the through holes 21 formed in the tubular members 17, 18 of the filtering device 5 and at the cylindrical portion 24 of the second separator 6 cannot be properly concentrated, with the result that the air bubbles cannot collect the particles.

Particularly, according to the data of TABLE-1, the particles removing rate can be 85% or higher if the admitting is set at 15.7 kPa or higher. Therefore, it is preferable to set the admitting pressure of the stock solution into the apparatus at 15.7 kPa or higher.

If the admitting pressure of the stock solution is excessively high, the swirl for creating the static pressure difference may become turbulent, and the particles removing rate may be reduced resulting the discharge of the particles to the outside within a short period of time. However, according to the experimental results, such an event never occurred if the admitting pressure of the stock solution is 23.5 kPa or below. The reason for this is thought to be that the tubular members 17, 18 of the filtering device 5 act to rectify the swirl and the air bubbles unexpectedly quickly reach the through holes 21 of the filtering device 5 and the cylindrical portion 24 of the second separator 6 with respect to the static pressure difference, thereby displaying a sufficient particles collecting action.

Figure 8:
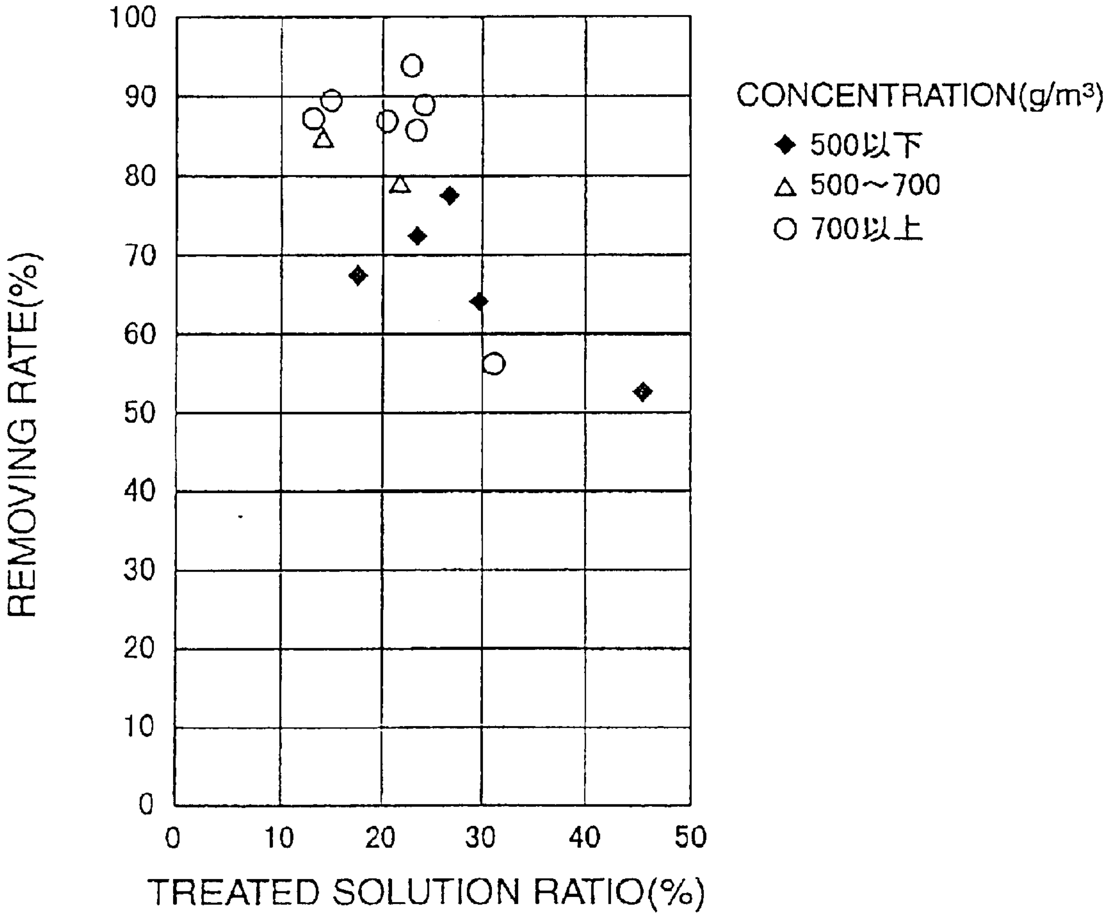
FIG. 8 is a graph showing a relationship between a treated solution ratio and the removing rate of the particles.

FIG. 8 shows the particles removing rate in relation to the treated solution ratio which is a ratio of the admitting flow rate of the stock solution supplied from the stock solution feeder 1 to the discharging flow rate of the clear solution. This graph shows that an excellent separation having a particles removing rate of 65% or higher is obtained if the treated solution ratio is set at 25% or lower. The reason for this is thought to be that the admitting flow rate of the stock solution and the discharging flow rate of the clear solution can be properly balanced by setting the treated solution ratio at 25% or lower, thereby preventing an occurrence of an event where the air bubbles which should deposit at the through holes 21 of the filtering device 5 and the cylindrical portion 24 of the second separator 6 are discharged to the outside through the discharge passage by losing this balance.

Since the filtering device 5 is constructed by the first and second tubular members 17, 18 opposed to each other between the first and second separators 3, 6 in the foregoing embodiment, the first clear solution containing the particles having specific gravities similar to that of water can effectively have its particles collected by the air bubbles a depositing in such a manner as to cover the through holes 21 formed in the respective tubular members 17, 18 while remaining between the first and second tubular members 17, 18. Accordingly, the concentrated solution having a high content of particles having specific gravities similar to that of water can be discharged to the outside through the concentrated solution passage 7, thereby effectively improving the particles removing rate.

Figure 9C:
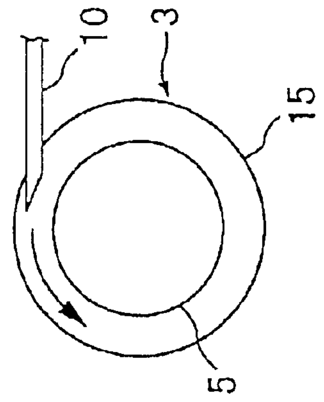
FIGS. 9A to 9C are diagrams showing another embodiment of the invention.
Figure 9B:
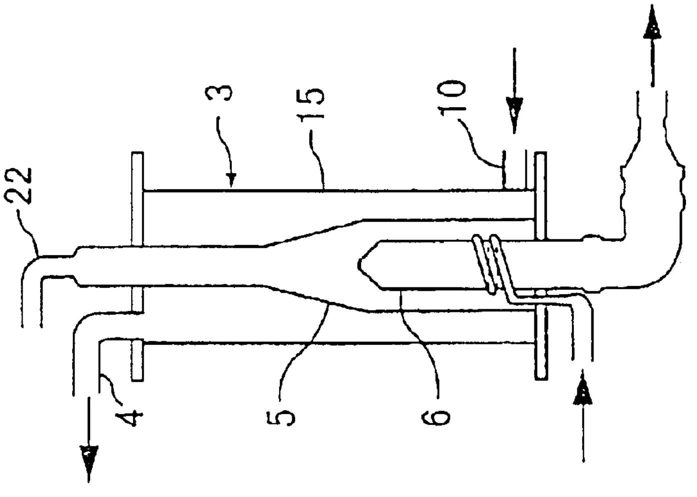
Figure 9A:
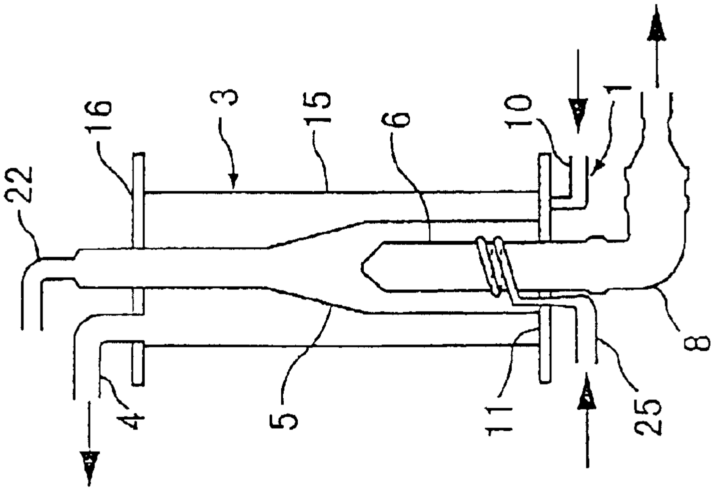

Further, the filtering device 5 may be formed of a single tubular member as shown in FIG. 9A or may be formed of three or more tubular members arranged one inside another at specified intervals. Alternatively, a filtering device formed of a reticulated material or the like may be provided between the first and second separators 3, 6. However, if the filtering device is formed of the first and second tubular members 17, 18 formed with the through holes 21 as in the basic embodiment, the air bubbles a for collecting the particles having specific gravities similar to that of water can effectively deposit on the wall surface thereof.

Further, since the concentrated solution discharge passage 7 for discharging the concentrated solution containing the particles having specific gravities similar to that of water which are collected by the filtering device 5 is independently provided in the foregoing embodiment, such particles can be separately collected and they are effectively prevented from mixing into the clear solution guided to the outside through the clear solution guide passage 8.

Furthermore, since the tapered conical potions 19, 20 are provided at at least parts of the first and second tubular members 17, 18 of the filtering device 5 in the foregoing embodiment, the swirl for separating the particles can be effectively generated according to the centrifugal force created by swirling the stock solution supplied into the first separator 3 from the stock solution feeder 1 is effectively swirled to separate the particles along the conical portions 19, 20 of the first and second tubular members 17, 18. Therefore, the particles contained in the stock solution and having large specific gravities can be efficiently separated.

Instead of the above embodiment in which the leading end of the stock solution supply passage 10 of the stock solution feeder 1 is connected with the bottom lid 11, the stock solution supply passage 10 may be connected with a bottom portion of the outer surface of the outer tube 15 of the first separator in such a manner that the leading end thereof extend in a direction along the inner surface of the separator 3, i.e., a direction tangential to the outer tube 15 as shown in FIGS. 9B and 9C. In such a construction, a centrifugal force or the like for separating the particles having specific gravities larger than that of water can be effectively created by causing the stock solution supplied from the stock solution supply passage 10 to flow along the inner surface of the outer tube 15.

Further, in the case that the second discharge passage 22 for discharging the second concentrated solution having a high content of particles having small specific gravities separated by the second separator 6 is provided, and the second concentrated solution is discharged through a passage different from the concentrated solution discharge passage 7 for discharging the concentrated solution having a high content of particles collected by the filtering device 5 as in the base embodiment shown in FIG. 1, the following effects can be obtained. First, the particles having different specific gravities can be separately collected. Further, the particles of the second concentrated solution having smaller specific gravities can be effectively prevented from mixing into the clear solution to be guided outside through the clear solution guide passage 8 by discharging the second concentrated solution to the outside through the second discharge passage 22.

Particularly, in the foregoing embodiment, the second concentrated solution discharged to the outside through the second discharge passage 22 is recycled to between the first and second tubular members 17, 18 of the filtering device 5 by the recycle passage 25 and is regularly discharged to the outside. Accordingly, the particles in the second concentrated solution separated by the second separator 6 can be discharged to the outside through the concentrated solution discharge passage 7 or the like after the concentration thereof is effectively increased, thereby effectively improving the particles removing rate. It should be noted that a liquid pump for pressure-feeding the second concentrated solution to between the first separator 3 and the second separator 6 may be provided in the recycle passage 25 or the like to forcibly recycle the second concentrated solution to between the first and second tubular members 17, 18 at a specified pressure.

Further, in the foregoing embodiment, the second concentrated solution supplied to between the first and second tubular members 17, 18 of the filtering device 5 via the recycle passage 25 is caused to flow along the outer surface of the second separator 6 by setting a direction of the second concentrated solution recycled via the recycle passage 25 at a direction along the outer surface of the second separator 6 in plan view. Accordingly, the gas-liquid mixed swirl can be effectively generated where the second separator 6 is provided. Further, since the particles contained in the second concentrated solution and having specific gravities similar to that of water can be removed by being effectively collected by the air bubbles a depositing on the filtering device 5, a filtering effect of the filtering device 5 can be improved.

Figure 10A:
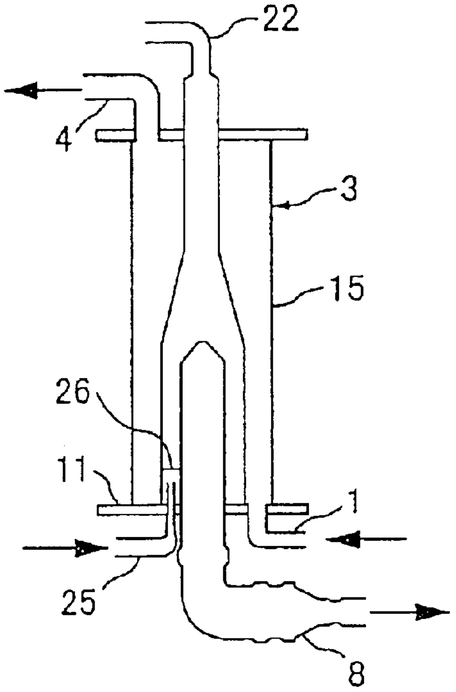
FIGS. 10A and 10B are diagrams showing still another embodiment of the invention.

The leading end of the recycle passage 25 may be connected with the bottom lid 11 as shown in FIG. 10A to supply the second concentrated solution from below between the filtering device 5 and the second separator 6. In such a case, it is desirable to swirl the second concentrated solution by providing a guide plate 26 for guiding the second concentrated solution in a direction along the outer surface of the second separator 6.

Furthermore, in the foregoing embodiment, two swirls having different swirling directions outside and inside the filtering device 5 are formed by setting the swirling direction $\alpha$ of the stock solution supplied into the first separator 3 by the stock solution feeder 1 opposite from the swirling direction $\beta$ of the second concentrated solution supplied via the recycle passage 25. Thus, the particles filtering effect of the filtering device 5 can be effectively improved.

Further, in the foregoing embodiment, the outer tube 15 having an outer surface extending straight along its longitudinal direction is provided at the outer side of the first separator 3, the outer casing of the particle separating apparatus can be easily formed by the outer tube 15 having a simple construction. Further, since no bulged portion is formed on the outer surface unlike the prior art apparatus disclosed in the above publication, there is no likelihood that the centrifugal force is reduced due to the swirl becoming turbulent at the bulged portion. As a result, a function for separating the particles having large specific gravities by a centrifugal force can be effectively improved.

Figure 10B:
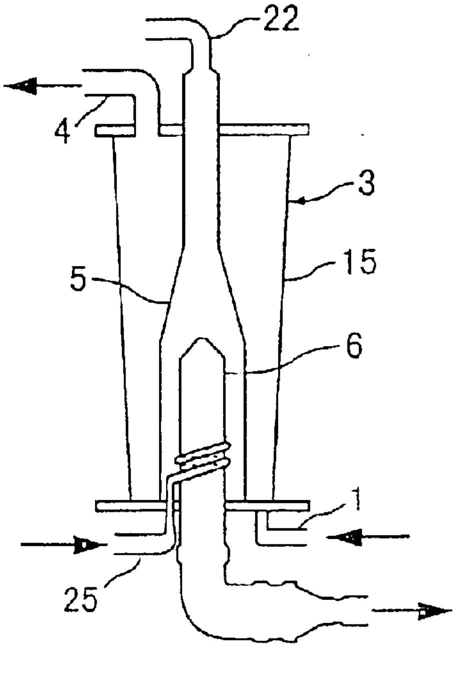

Unlike the basic embodiment in which the outer tube 15 is formed by the cylindrical members 13, 14, the outer tube 15 may be formed by a polygonal tube having a hexagonal or octagonal cross section. Further, the outer tube 15 is not limited to tubular member having a uniform inner diameter. For example, the outer tube 15 of the first separator 3 may be formed of a tubular member which is widened toward the top as shown in FIG. 10B.

In the case that the pair of lids 16, 11 for closing the opposite open ends of the outer tube 15 provided at the outer side of the first separator 3 are provided as in the basic embodiment shown in FIG. 1, the outer casing of the particle separating apparatus can be easily formed by the outer tube 15 and the lids 16, 11 having each a simple construction. Further, the layout of the first discharge passage 4 for discharging the first concentrated solution separated by the first separator 3 and the second discharge passage 22 for discharging the second concentrated solution separated by the second separator 6 can be improved while ensuring a satisfactory concentrated solution discharging function by connecting the first discharge passage 4 with the outer side of the lid 16 and connecting the second discharge passage 22 with the center of the lid 16 as in the basic embodiment.

In the case that the outer tube 15 provided at the outer side of the first separator 3 is formed by a plurality of tubular members including the cylindrical tubes 13, 14 connected one on top of another as shown in FIG. 1, there is an advantage that an outer casing for a large-sized particle separating apparatus can be easily formed by the plurality of tubular members having a simple construction.

Further, in the case that gas is injected into the stock solution by the gas injector 2*b* of the bubble generator 2 as in the foregoing embodiment, the air bubbles for separating the particles can be easily and inexpensively generated without using a special chemical for effectively separating the particles by collecting them.

Further, in the case that sodium bicarbonate, dry ice, hydrogen peroxide or like foaming agent is injected into the stock solution by the foaming agent injector 2*a* in addition to gas, air bubbles for promoting the separation of particles can be effectively generated by the resolution or dissolution of the foaming agent.

Particularly, in the case that a foaming agent containing sodium bicarbonate is injected into the stock solution by the foaming agent injector 2*a* of the bubble generator 2, air bubbles containing carbon dioxide for promoting the separation of particles can be properly generated by resolving relatively inexpensive sodium bicarbonate in the stock solution.

Together with the foaming agent, a foam stabilizer containing a protein such as keratin, saponin, albumin, polyvinyl alcohol, soaps or like surface-active agent may be supplied into the stock solution. In such a case, a sufficient surface area of the air bubbles can be secured by stabilizing the air bubbles, and the effect of collecting the particles by the air bubbles can be improved. Therefore, a particle separating efficiency can be effectively improved.

Figure 11C:
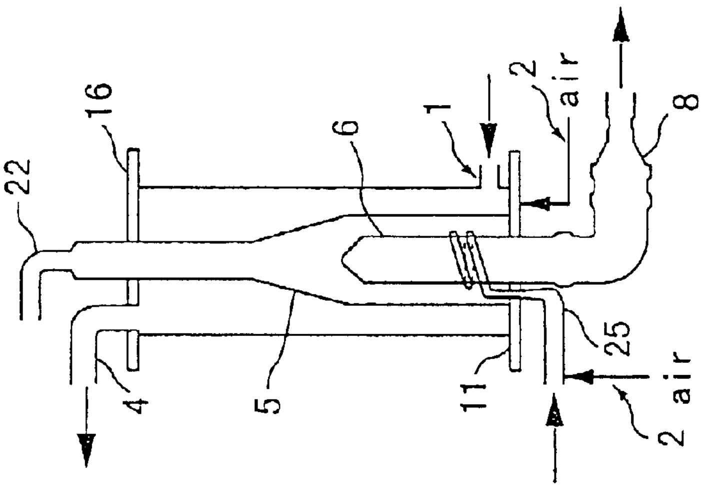
FIGS. 11A to 11C are diagrams showing further another embodiment of the invention.
Figure 11B:
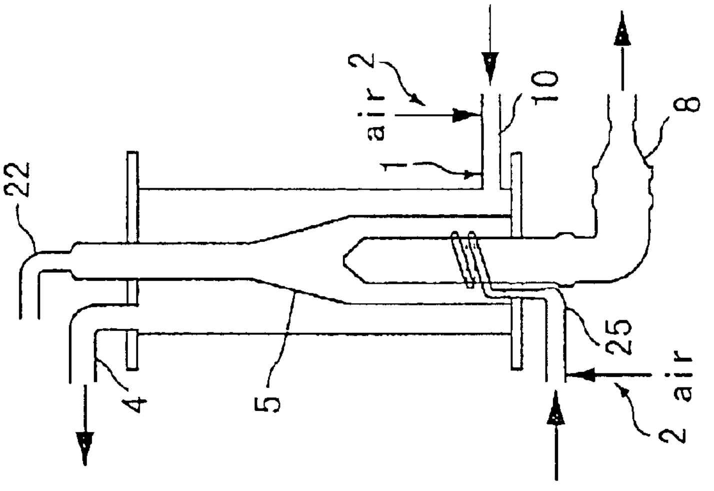
Figure 11A:
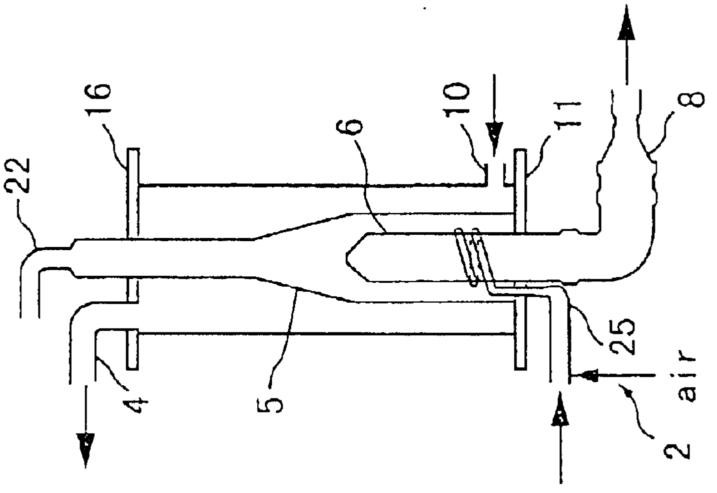

Instead of the construction in which the bubble generator 2 is provided in the stock solution supply passage 10, the bubble generator 2 may be provided in the recycle passage 25 as shown in FIG. 11A; or may be provided in both of the stock solution supply passage 10 of the stock solution feeder 1 and the recycle passage 25; or may be provided on the lower surface of the bottom lid 11 to directly inject gas or the foaming agent into the outer tube 15 of the first separator 3.

Since the base end, i.e., the upper end of the clear solution guide passage 8 for guiding the second clear solution to the outside is provided inside the filtering device 5 in the foregoing embodiment, the second clear solution can be guided to the outside via the clear solution guide passage 8 without damaging the particle filtering action by the filtering device 5 in a simple and compact construction.

Figure 12C:
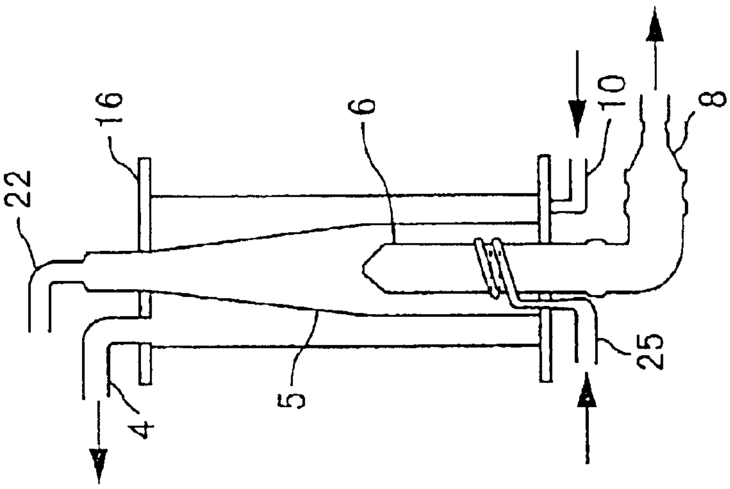
FIGS. 12A to 12C are diagrams showing still another embodiment of the invention.
Figure 12B:
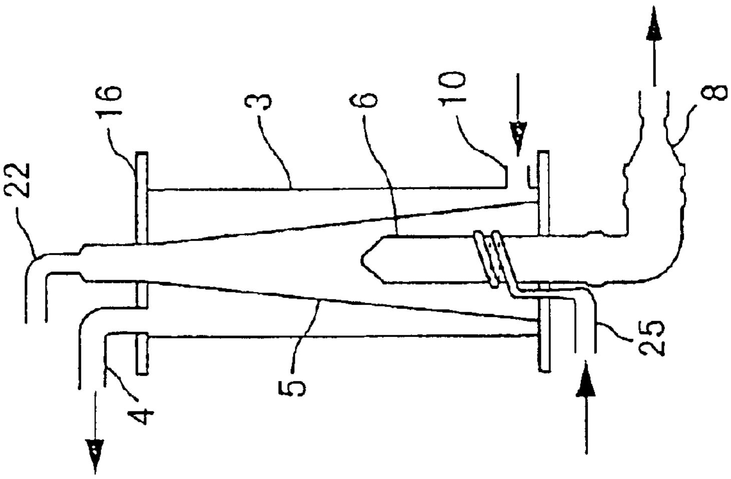
Figure 12A:
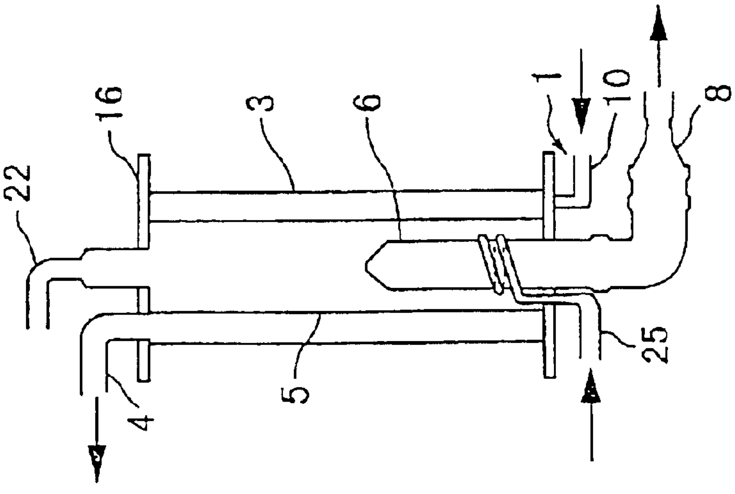

The filtering device 5 may be constructed by a tubular member having a uniform diameter as shown in FIG. 12. However, there is an advantage of properly arranging the filtering device 5 and the clear solution guide passage 8 in a more simple and compact construction if the filtering device 5 is constructed by a tapered (toward the top) conical tubular member as shown in FIGS. 12B and 12C and the second separator 6 and the base end of the clear solution guide passage 8 are arranged in the large-diameter portion of the conical tubular member.

If the stock solution passage 10 of the stock solution feeder 1 and the clear solution guide passage 8 are connected to one end of the outer tube 15 of the first separator 3 and the first discharge passage 4, the second discharge passage 22, etc. are connected with the other end of the outer tube 15 as in the basic embodiment shown in FIG. 1, the passages 10, 8 and the discharge passages 4, 22 can be respectively functionally connected with the opposite ends of the outer tube 15 in a compact manner. As a result, the particles can be separated effectively using the entire length of the outer tube 15.

Figure 13A:
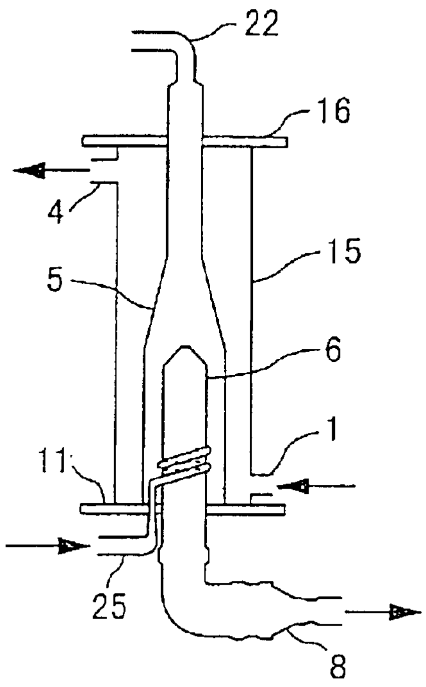
FIGS. 13A and 13B are diagrams showing further another embodiment of the invention.
Figure 13B:
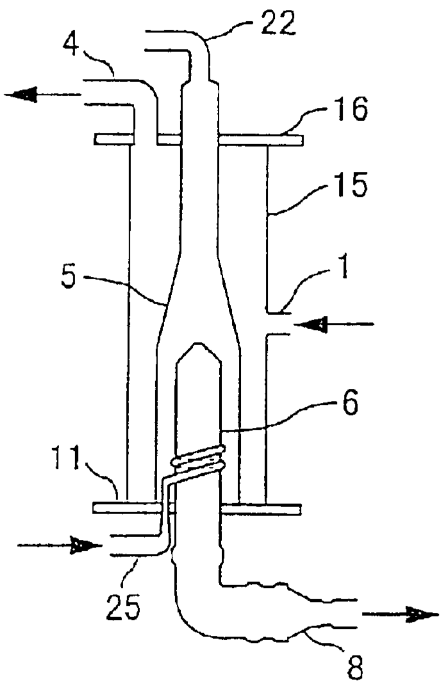

The first discharge passage 4 and the stock solution supply passage 10 may be connected with the upper and lower ends of the side surface of the outer tube 15, respectively, as shown in FIG. 13A. Alternatively, the stock solution supply passage 10 may be connected in the middle of the side surface of the outer tube 15 as shown in FIG. 13B. However, if the stock solution supply passage 10 and the clear solution guide passage 8 are connected with the lid 11 covering one end of the outer tube 15 and the first and second discharge passages 4 and 22 are connected with the other end of the outer tube 15 as in the basic embodiment, connection can be easily made to the flat surfaces of the lids 11, 16.

Figure 14A:
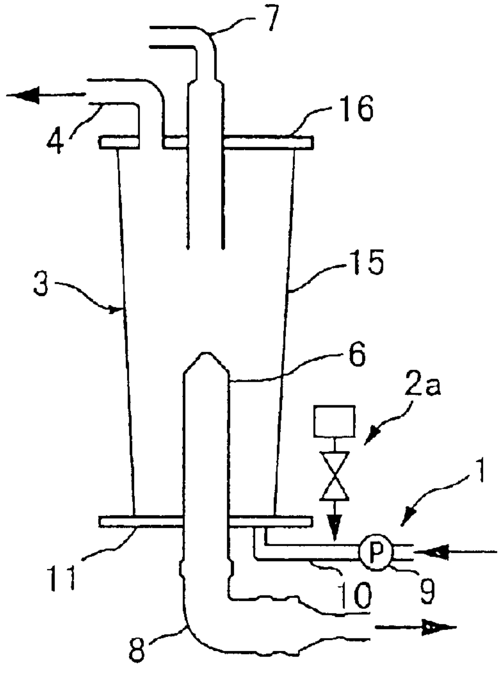
FIGS. 14A and 14B are diagrams showing still another embodiment of the invention.

As shown in FIG. 14A, in the particle separating apparatus which is provided with an outer tube 15 formed of a tubular member, a pair of lids 11, 16 for closing the opposite ends of the outer tube 15, a stock solution feeder 1 for feeding a stock solution into the outer tube 15, a bubble generator comprising a foaming agent injector 2*a*, a particle separator 6*a* constructed substantially in the same way as the second separator 6, concentrated solution discharge passages 4, 7 for discharging a concentrated solution to the outside, and a clear solution guide passage 8 for guiding a clear solution to the outside, the discharge passages 4,7, and the stock solution feeder 1 may provided in positions spaced apart in the longitudinal direction of the outer tube 15, and the outer diameter of the connected end of the stock solution feeder 1 is set smaller than the outer diameters of the connected ends of the discharge passages 4, 7.

In this construction, the stock solution supplied from the stock solution feeder 1 can be effectively swirled over the entire length of the outer tube 15 which is widened toward its top. Accordingly, particles having large specific gravities can be efficiently separated by a centrifugal force created by this swirl. Further, by swirling the stock solution, air bubbles and the like are moved toward the center according to a static pressure difference created in radial directions of the swirl, thereby generating a gas-liquid mixed swirl. The gas-liquid mixed swirl can concentrate the particles on one end of the axial direction thereof, thereby separating the stock solution into the concentrated solution and the clear solution.

Figure 14B:
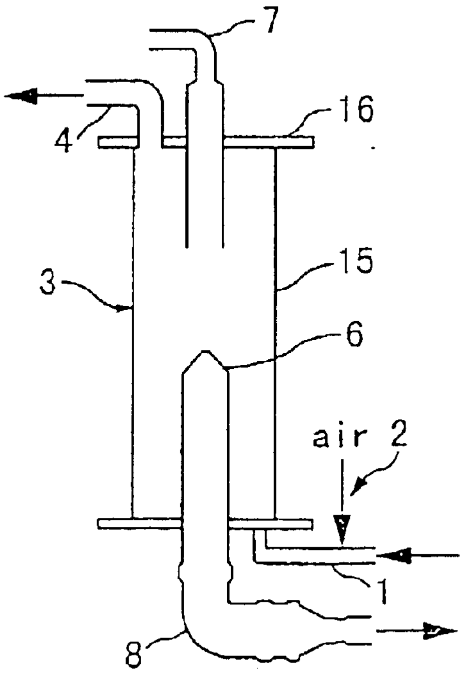

Further, as shown in FIGS. 14A and 14B, in the particle separating apparatus which is provided with an outer tube 15 formed of a tubular member, a pair of lids 11, 16 for closing the opposite ends of the outer tube 15, a stock solution feeder 1 for feeding a stock solution into the outer tube 15, a particle separator 6*a* constructed substantially in the same way as the second separator 6, concentrated solution discharge passages 4, 7 for discharging a concentrated solution to the outside, and a clear solution guide passage 8 for guiding a clear solution to the outside, the outer tube 15 may have a straight inner wall surface between where the stock solution feeder 1 is connected and where the discharge passages 4, 7 are connected. In this case, particles having large specific gravities can be more efficiently separated by swirling the stock solution supplied from the stock solution feeder 1 along the wall surface of the outer tube 15; particles having small specific gravities can be more efficiently separated by the particle separator 6*a*; and the outer casing of the particle separating apparatus can be easily formed by the outer tube 15 having a simple and compact construction.

It is particularly advantageous to form the outer tube 15 by a tubular member having a uniform inner diameter along its length as shown in FIG. 14B. If the outer diameter of the connected end of the stock solution feeder 1 is set equal to that of the connected ends of the concentrated solution discharge passages 4, 7, the outer casing of the particle separating apparatus can be more easily and inexpensively formed by the outer tube 15 having a simple construction without degrading the action of separating particles having large specific gravities according to a centrifugal force created by the swirl of the stock solution supplied from the stock solution feeder 1 along the inner wall surface of the outer tube 15 and the action of separating particles having small specific gravities by the particle separator 6*a*.

If the concentrated solution discharge passages 4, 7 are connected with the lid 16 for closing the opening of the outer tube 15 in the particle separating apparatus, they can be more easily and properly connected with the flat surface of the lid 16 as compared with the case where they are connected with the outer tube 15 formed by a tubular member.

Further, if the stock solution supply passage 10 of the stock solution feeder 1 is connected with the lid 11 for closing the opening of the outer tube 15 in the particle separating apparatus, it can be more easily and properly connected with the flat surface of the lid 11 as compared with the case where it is connected with the outer tube 15 formed by a tubular member.

Further, in the particle separating apparatus provided with the outer tube 15 formed by the tubular member, the pair of lids 11, 16 for closing the openings at the opposite ends of the outer tube 15, the stock solution feeder 1 for supplying the stock solution into the separating apparatus, the particle separator 6*a* for moving the air bubbles toward the center according to a static pressure difference created in radial directions by swirling the stocking solution supplied from the stock solution feeder 1, thereby generating a gas-liquid mixed swirl, and concentrating the particles on one end of the longitudinal direction of the swirl by the gas-liquid mixed. swirl to separate the stock solution into a concentrated solution and a clear solution, the concentrated solution discharge passage 7 for discharging the concentrated solution to the outside, and the clear solution guide passage 8 for guiding the stock solution to the outside, the foaming agent injector 2*a* for injecting sodium bicarbonate, dry ice, hydrogen peroxide, or like foaming agent to promote the separation of particles may be provided as shown in FIG. 14A.

In this construction, the air bubbles generated by resolving or dissolving the foaming agent such as sodium bicarbonate injected into the stock solution by the foaming agent injector 2*a* are supplied to the particle separator 6*a*. This brings about an advantage that the particles having small specific gravities can be effectively separated by effectively improving the particle separating efficiency of the particle separator 6*a*.

Further, if the liquid pump 9 for pressure-feeding the stock solution is provided in the stock solution supply passage 10 of the stock solution feeder 1 in the above particle separating apparatus as shown in FIG. 14A, the air bubbles are moved toward the center according to the static pressure difference created in radial directions by swirling the stock solution pressure-fed by the liquid pump 9, thereby effectively generating the gas-liquid mixed swirl.

Furthermore, the construction in which the foaming agent injector 2*a* is connected with the downstream side of the liquid pump 9 as shown in FIG. 14A is free from an occurrence of cavitation resulting from the sudden generation of air bubbles in large quantity by the injected foaming agent being agitated in the liquid pump 9 unlike the construction in which the foaming agent injector 2*a* is connected with the upstream side of the liquid pump 9. Therefore, the damage of the liquid pump 9 can be effectively prevented.

If the liquid pump 9 which is free from an occurrence of the cavitation, the foaming agent injector 2*a* may be connected with the upstream side of the liquid pump 9. In such a case, the foaming agent injected to the upstream side of the liquid pump 9 from the foaming agent injector 2*a* can be mixed into the stock solution while being effectively diffused by agitating it in the liquid pump 9.

Both the gas injector 2*b* for injecting gas to promote the separation of particles and the foaming agent injector 2*b* may be provided as in the embodiment shown in FIG. 1. In such a construction, the separation of particles can be more effectively promoted by the foaming agent injected by the foaming agent injector 2*a* and the gas injected by the gas injector 2*b*. Further, in addition to the gas injector and the foaming agent injector, a foam stabilizer injector for supplying a foam stabilizer comprising a protein such as keratin, saponin, albumin, polyvinyl alcohol, soaps or like surface-active agent may be provided.

Although the particles present in the form of particulate solids in the stock solution are supplied into the separating apparatus in the foregoing embodiments, the present invention is also applicable to the following separation. After a chemical such as a coagulating agent is injected into a stock solution in which impurities such as cattle's urine is dissolved to coagulate the impurities, this stock solution is supplied into the separating apparatus to separate the particles, i.e., the impurities.

The particle separating apparatus enables the liquid supplied from the stock solution feeder 1 to be efficiently brought into contact with the gas such as air injected from the bubble generator 2 by generating the gas-liquid mixed swirl. Accordingly, this apparatus can also be used as a reaction promoting apparatus for promoting various reactions including a burning action of a fuel such as alcohol, a catalyzing action of a gas-liquid reaction system, a coagulating action, and heat exchanging action of gas-liquid system in addition to the particle separating action.

As described above, an inventive particle separating apparatus for separating a stock solution containing particles into a concentrated solution having a high content of particles and a clear solution having a low content of particles, comprises: a stock solution supplier for supplying the stock solution into a main portion of the separating apparatus; a bubble generator for generating air bubbles to promote the separation of particles; a first separator for separating the stock solution into a first concentrated solution and a first clear solution according to a centrifugal force created by swirling the stock solution supplied from the stock solution supplier: a first discharge passage for discharging the first concentrated solution separated by the first separator to the outside; a filter provided inside the first separator for permitting the passage of the first clear solution and collecting the particles in the first clear solution; a second separator provided inside the filter for generating a gas-liquid mixed swirl of the air bubbles and the first clear solution at or near its center according to a static pressure difference created in its radial directions by swirling the first clear solution, and separating the first clear solution into a second concentrated solution and a second clear solution by the generated swirl; a second discharge passage for discharging the second concentrated solution separated by the second separator to the outside; and a clear solution guide passage for guiding the second clear solution to the outside.

With this construction, the first clear solution produced by separating the particles having large specific gravities by the first separator has the particles contained therein collected by the filter while passing a site where the filter is installed, which prevents the particles having specific gravities similar to that of water from being admitted into a site where the second separator is installed. This prevents the particles from being mixed into the clear solution guided to the outside via the clear solution guide passage after being separated by the second separator.

The filter may be provided with a tubular member formed with through holes to be covered by the air bubbles. With such a filter, the particles contained in the first clear solution and having specific gravities similar to that of water are collected by the air bubbles depositing in such a manner as to cover the through holes of the tubular member while being moved inward by passing the installation site of the filter according to the static pressure difference created by swirling the stock solution supplied to the first separator. Thus, the first clear solution can be effectively filtered.

Also, the filter may be provided with a plurality of tubular members arranged opposite to each other between the first and second separator. With such a filter, the particles contained in the first clear solution and having specific gravities similar to that of water are effectively collected by the air bubbles depositing in such a manner as to cover the through holes of the tubular member, while the first clear solution produced by removing the particles having large specific gravities from the stock solution according to the centrifugal force created by swirling the stock solution supplied from the stock solution supplier is remaining in the plurality of tubular members. Thus, the first clear solution can be effectively filtered.

There may be further provided a concentrated solution discharge passage for discharging a concentrated solution containing the particles collected by the filter to the outside. With this arrangement, the concentrated solution is produced by concentrating the particles collected by the filter comprising the plurality of tubular members, and is discharged to the outside via the concentrated solution discharge passage. This prevents the particles from being mixed into the clear solution guided to the outside via the clear solution guide passage.

A tapered conical portion may be formed at at least a portion of the tubular member of the filter. With this arrangement, the gas-liquid mixed swirl for separating the first clear solution into the second concentrated solution and the second clear solution can be generated by swirling the first clear solution supplied into the filtering device along the conical portion of the tubular member.

There may be further provided a recycle passage for recycling the second concentrated solution separated by the second separator to between the first and second separator. With this arrangement, since the second concentrated solution separated by the second separator is supplied to between the first and second separator via the recycle passage, it is discharged to the outside via the concentrated solution discharge passage and the like after the concentration of the particles therein is effectively increased.

A swirling direction of the stock solution supplied by the stock solution supplier and that of the second concentrated solution supplied via the recycle passage are set opposite to each other. With this arrangement, since two swirls having different swirling directions are generated inside and outside the filter, the particles can be more effectively collected by the filter.

There may be further provided an outer tube around the first separator, the circumferential surface of the outer tube extending straight along the longitudinal direction thereof. With this arrangement, the outer casing of the particle separating apparatus can be easily formed by the outer tube having a simple construction.

There may be further provided a pair of lids for closing openings at the opposite ends of the outer tube around the first separator. With this arrangement, the outer casing of the particle separating apparatus can be easily formed by the pair of lids and the outer tube which each have a simple construction.

The bubble generator may be made to inject air into the stock solution. With this arrangement, the air bubbles for promoting the separation of particles can be generated in the second separator and the like by the air injected into the stock solution by the bubble generator.

The bubble generator may be made to inject a foaming agent into the stock solution. With this arrangement, the air bubbles for promoting the separation of particles can be generated in the second separator and the like by the resolution or dissolution of the foaming agent injected into the stock solution by the bubble generator.

The foaming agent injected by the bubble generator may be sodium bicarbonate. With such a foaming agent, air bubbles containing carbon dioxide are generated by the resolution of sodium bicarbonate injected into the stock solution by the bubble generator, and the separation of particles is promoted by these air bubbles.

The filter may be in the form of a conical tube and the base end of the clear solution guide passage may be arranged at a large-diameter portion of the filter. With this arrangement, the clear solution guide passage can be easily connected with the large-diameter portion of the filter in the form of a conical tube while making the entire construction of the separating apparatus compact.

Another inventive particle separating apparatus comprises an outer tube formed of a tubular member; a pair of lids for closing openings at the opposite ends of the outer tube; an inner tube provided inside the outer tube and formed with through holes; a stock solution supplier for supplying the stock solution into the separating apparatus in such a manner as to swirl the stock solution along the outer tube; a first discharge passage for discharging a first concentrated solution separated by a centrifugal force acting as the stock solution is swirled; a bubble generator for generating air bubbles to collect the particles in a first clear solution produced by separating the stock solution by the centrifugal force when the first clear solution is admitted into the inner tube through the through holes of the inner tube; a particle separating unit provided inside the inner tube for moving the air bubbles toward its center according to a static pressure difference created in its radial directions by swirling the first clear solution to generate a gas-liquid mixed swirl and concentrating the particles on one side of the longitudinal direction of the gas-liquid mixed swirl by the gas-liquid mixed swirl to separate the first clear solution into a second concentrated solution and a second clear solution; a second discharge passage for discharging the second concentrated solution separated by the particle separating unit to the outside; and a clear solution guide passage for guiding the second clear solution produced by removing the particles to the outside.

With this construction, an action of separating the particles having large specific gravities by the centrifugal force created by swirling the stock solution supplied from the stock solution supplier along the outer tube, an action of collecting the particles having specific gravities similar to that of water by the air bubbles depositing in such a manner as to cover the through holes of the inner tube, and an action of separating the particles having specific gravities smaller than that of water in the particle separating unit can be effectively obtained in a limited space.

In this separating apparatus, a stock solution supply passage of the stock solution supplier and the clear solution guide passage may be connected with one end of the outer tube and the first and second discharge passages are connected with the other end of the outer tube. With this arrangement, the stock solution supply passage, the clear solution guide passage, and the first and second discharge passages can be functionally connected with the opposite ends of the outer tube in a compact manner, respectively.

The stock solution supply passage of the stock solution supplier and the clear solution guide passage may be connected with the lid for closing one end of the outer tube, and the first and second discharge passages may be connected with the lid for closing the other end of the outer tube. With this arrangement, the stock solution supply passage, the clear solution guide passage, and the first and second discharge passages can be functionally connected with the lids provided at the opposite ends of the outer tube in a compact manner, respectively.

The admitting pressure of the stock solution supplied from the stock solution supplier into the apparatus may be set at 14.7 kPa or higher. With this arrangement, the stock solution supplied at a pressure of 14.7 kPa or higher from the stock solution supplier is swirled at a specified velocity in the separating apparatus, thereby properly creating the static pressure difference for moving the gas-liquid mixed swirl of the air bubbles and the first clear solution toward the center of the separating apparatus.

A treated solution ratio, which is a ratio of a flow rate of the admitted stock solution and that of the clear solution guided to the outside, may be set 25% or lower. With this arrangement, a balance between the flow rate of the stock solution being admitted and that of the clear solution being guided out can be properly maintained, thereby effectively preventing an occurrence of an event where the air bubbles, which should deposit on the through holes formed in the tubular member, are discharged to the outside due to a lost balance.

A further inventive particle separating apparatus comprises: an outer tube formed of a tubular member; a pair of lids for closing openings at the opposite ends of the outer tube; a stock solution supplier for supplying the stock solution into the outer tube; a bubble generator for generating air bubbles to promote the separation of particles; a particle separating unit for moving the air bubbles toward its center according to a static pressure difference created in its radial directions by swirling the stock solution supplied from the stock solution supplier to generate a gas-liquid mixed swirl and concentrating the particles on one side of the longitudinal direction of the gas-liquid mixed swirl by the gas-liquid mixed swirl to separate the stock solution into a concentrated solution and a clear solution; a concentrated solution discharge passage for discharging the concentrated solution to the outside; and a clear solution guide passage for guiding the clear solution produced to the outside; wherein the concentrated solution discharge passage and the stock solution supplier are connected with the outer tube in positions spaced apart along the longitudinal direction of the outer tube, and the outer diameter of the connected end of the stock solution supplier is set smaller than that of the connected end of the concentrated solution discharge passage.

With this construction, the centrifugal force created by swirling the stock solution supplied from the stock solution supplier to one end of the inside of the outer tube can be stably upheld over the entire length of the outer tube. Accordingly, the static pressure difference for moving the gas-liquid mixed swirl of the air bubbles and the first clear solution toward the center of the separating apparatus can be distinctly created in a range between where the stock solution supplier is installed and where the concentrated solution discharge passage is installed. Therefore, the gas-liquid mixed swirl for separating the stock solution into the particles and the clear solution can be effectively generated by concentrating the particles collected by the air bubbles on one end of the longitudinal direction of the swirl.

A yet further particle separating apparatus comprises: an outer tube formed of a tubular member; a pair of lids for closing openings at the opposite ends of the outer tube; a stock solution supplier for supplying the stock solution into the outer tube; a bubble generator for generating air bubbles to promote the separation of particles; a particle separating unit for moving the air bubbles toward its center according to a static pressure difference created in its radial directions by swirling a stock solution supplied via the stock solution supply passage of the stock solution supplier to generate a gas-liquid mixed swirl and concentrating the particles on one side of the longitudinal direction of the gas-liquid mixed swirl by the gas-liquid mixed swirl to separate the stock solution into a concentrated solution and a clear solution; a concentrated solution discharge passage for discharging the concentrated solution to the outside; and a clear solution guide passage for guiding the clear solution produced to the outside. The circumferential surface of the outer tube is formed straight between a portion near where the stock solution supply passage is connected and a portion near where the concentrated solution discharge passage is connected.

With this construction, an action of separating the particles having large specific gravities by swirling the stock solution supplied via the stock solution supply passage along the inner surface of the outer tube, and an action of separating the particles by concentrating the particles having small specific gravities on one end of the longitudinal direction of the swirl in the particle separating unit can be effectively obtained in a limited space. Further, the outer casing of the particle separating apparatus can be formed by the outer tube having a simple construction.

In this separating apparatus, the outer diameter of the connected end of the stock solution supply passage may be set equal to that of the connected end of the concentrated solution discharge passage. With this arrangement, the outer casing of the particle separating apparatus can be formed by the outer tube having a further simpler construction without impairing the action of separating the particles having large specific gravities by swirling the stock solution supplied via the stock solution supply passage along the inner surface of the outer tube, and the action of separating the particles having small specific gravities by the particle separating unit.

The concentrated solution discharge passage may be connected with the lid for closing the opening of the outer tube. With this arrangement, the concentrated solution discharge passage can be easily connected with the lid for closing the opening of the outer tube.

The stock solution supply passage may be connected with the lid for closing the opening of the outer tube. With this arrangement, the stock solution supply passage can be easily connected with the lid for closing the opening of the outer tube.

A still further particle separating apparatus comprises: a stock solution supplier for supplying the stock solution into the separating apparatus; a foaming agent injector for injecting a foaming agent to promote the separation of particles; a particle separating unit for moving the air bubbles toward its center according to a static pressure difference created in its radial directions by swirling the stock solution supplied via a stock solution supply passage of the stock solution supplier to generate a gas-liquid mixed swirl and concentrating the particles on one side of the longitudinal direction of the gas-liquid mixed swirl by the gas-liquid mixed swirl to separate the stock solution into a concentrated solution and a clear solution; a concentrated solution discharge passage for discharging the concentrated solution to the outside; and a clear solution guide passage for guiding the clear solution produced to the outside.

With this construction, fine air bubbles are generated by the resolution or dissolution of the foaming agent injected into the stock solution by the foaming agent injector. The gas-liquid mixed swirl concentrates the particles collected by these air bubbles on one end of the longitudinal direction thereof, thereby effectively separating the particles having small specific gravities in the particle separating unit.

In this separating apparatus, a liquid pump for pressure-feeding the stock solution may be provided in the stock solution supply passage of the stock solution supplier, and the foaming agent is injected at a downstream side of the liquid pump. With this arrangement, the gas-liquid mixed swirl for separating the particles having small specific gravities in the particle separating unit can be effectively generated by pressure-feeding the stock solution into the separating apparatus by the liquid pump. Further, the air bubbles for collecting the particles can be generated by the foaming agent injected into the stock solution without causing cavitation resulting from the agitation of the foaming agent injected from the foaming agent injector in the liquid pump.

A liquid pump for pressure-feeding the stock solution may be provided in the stock solution supply passage of the stock solution supplier, and the foaming agent is injected at an upstream side of the liquid pump. With this arrangement, the gas-liquid mixed swirl for separating the particles having small specific gravities in the particle separating unit can be effectively generated by pressure-feeding the stock solution into the separating apparatus by the liquid pump. Further, fine air bubbles for collecting the particles can be properly generated while being dispersed in the stock solution by agitating the foaming agent injected from the foaming agent injector in the liquid pump.

The foaming agent injected by the foaming agent injector may be sodium bicarbonate. With such a foaming agent, air bubbles containing carbon dioxide are generated by the resolution of sodium bicarbonate injected into the stock solution by the bubble generator, and the separation of particles is promoted by these air bubbles.

There may be further provided a gas injector for injecting a gas to promote the separation of particles. With this arrangement, the air bubbles for collecting the particles can be effectively generated by the foaming agent injected from the foaming agent injector and the gas injected from the gas injector.

INDUSTRIAL APPLICABILITY

As described above, an inventive particle separating apparatus is adapted for separating a stock solution containing particles into a concentrated solution having a high content of particles and a clear solution having a low content of particles. The apparatus is provided with a stock solution supplier for supplying a stock solution into a separating apparatus; a bubble generator for generating air bubbles to promote the separation of particles, a first separator for separating the stock solution into a first concentrated solution and a first clear solution by the centrifugal force created by swirling the stock solution supplied from the stock solution supplier; a first discharge passage for discharging the first concentrated solution separated by the first separator to the outside; a filter provided inside the first separator for permitting the passage of the first clear solution and collecting the particles in the first clear solution; a second separator provided inside the filter for generating a gas-liquid mixed swirl of air bubbles and the first clear solution at or near its center by a static pressure difference created in its radial directions by swirling the first clear solution, and separating the first clear solution into a second concentrated solution and a second clear solution by the generated swirl; a second discharge passage for discharging the second concentrated solution separated by the second separator to the outside; and a clear solution guide passage for guiding the second clear solution to the outside.

Accordingly, the particles having large specific gravities such as metals, colloidal or gelatinous particles having specific gravities similar to that of water, and the particles having small specific gravities such as oils can be advantageously efficiently separated, respectively.

What is claimed is:

1. A particle separating apparatus for separating a stock solution containing particles into a concentrated solution having a high content of particles and a clear solution having a low content of particles, comprising;

an outer tube formed of a tubular member;

a pair of lids for closing openings at the opposite ends of the outer tube;

a stock solution supplier for supplying the stock solution into the outer tube;

a bubble generator for generating air bubbles to promote the separation of particles;

a particle separating unit for moving the air bubbles toward its center according to a static pressure difference created in its radial directions by swirling the stock solution supplied from the stock solution supplier to generate a gas-liquid mixed swirl and concentrating the particles on one side of the longitudinal direction of the gas-liquid mixed swirl by the gas-liquid mixed swirl to separate the stock solution into a concentrated solution and a clear solution;

a concentrated solution discharge passage for discharging the concentrated solution to the outside; and a clear solution guide passage for guiding the clear solution produced to the outside;

wherein the concentrated solution discharge passage and the stock solution supplier are connected with the outer tube in positions spaced apart along the longitudinal direction of the outer tube, and the outer diameter of the connected end of the stock solution supplier is smaller than that of the connected end of the concentrated solution discharge passage and said outer tube has a straight inner wall that is configured such that the outer tube is widened towards its top.

2. A particle separating apparatus according claim 1, wherein the bubble generator includes a foaming agent injector for injecting a foaming agent to promote the separation of particles.

3. A particle separating apparatus according to claim 2, wherein a liquid pump for pressure-feeding the stock solution is provided in the stock solution supplier, and the foaming agent is injected at a downstream side of the liquid pump.

4. A particle separating apparatus according to claim 2, wherein a liquid pump for pressure-feeding the stock solution is provided in the stock solution supplier, and the foaming agent is injected at an upstream side of the liquid pump.

5. A particle separating apparatus according to claim 2, wherein the foaming agent injected by the foaming agent injector is sodium bicarbonate.

6. A particle separating apparatus according to claim 2, wherein the bubble generator includes a gas injector for injecting a gas to promote the separation of particles.

7. A particle separating apparatus for separating a stock solution containing particles into a concentrated solution having a high content of particles and a clear solution having a low content of particles, comprising:

an outer tube formed of a tubular member;

a pair of lids for closing openings at the opposite ends of the outer tube, wherein the outer tube maintains a constant diameter along its length and provides a continuously cylindrical inner space defined by said outer tube;

a stock solution supplier for supplying the stock solution into the outer tube;

a bubble generator for generating air bubbles to promote the separation of particles;

a particle separating unit for moving the air bubbles toward its center according to a static pressure difference created in its radial directions by swirling a stock solution supplied via the stock solution supply passage of the stock solution supplier to generate a gas-liquid mixed swirl and concentrating the particles on one side of the longitudinal direction of the gas-liquid mixed swirl by the gas-liquid mixed swirl to separate the stock solution into a concentrated solution and a clear solution;

a concentrated solution discharge passage being connected to one of the pair of lids for discharging the concentrated solution to the outside; and a clear solution guide passage being connected to the other one of the pair of lids for guiding the clear solution produced to the outside;

wherein the circumferential surface of the outer tube is formed straight between a portion near where a stock solution supply passage is connected and a portion near where the concentrated solution discharge passage is connected and wherein the outer diameter of the connected end of the stock solution supply passage is equal to that of the connected end of the concentrated solution discharge passage.

8. A particle separating apparatus according to claim 7, wherein the bubble generator includes a foaming agent injector for injecting a foaming agent to promote the separation of particles.

9. A particle separating apparatus according to claim 8, wherein a liquid pump for pressure-feeding the stock solution is provided in the stock solution supply passage of the stock solution supplier, and the foaming agent is injected at a downstream side of the liquid pump.

10. A particle separating apparatus according to claim 8, wherein a liquid pump for pressure-feeding the stock solution is provided in the stock solution supply passage of the stock solution supplier, and the foaming agent is injected at an upstream side of the liquid pump.

11. A particle separating apparatus according to claim 8, wherein the foaming agent injected by the foaming agent injector is sodium bicarbonate.

12. A particle separating apparatus according to claim 8, wherein said bubble generator includes a gas injector for injecting a gas to promote the separation of particles.

* * * * *